(12) United States Patent
Hayashi et al.

(10) Patent No.: US 6,820,682 B2
(45) Date of Patent: Nov. 23, 2004

(54) HEAT EXCHANGER

(75) Inventors: Takayuki Hayashi, Aichi-gun (JP); Takaki Okochi, Chiryu (JP); Akihiro Maeda, Kariya (JP); Kazuhiro Shibagaki, Kariya (JP)

(73) Assignee: DENSO Corporation, Kariya (JP)

( * ) Notice: Subject to any disclaimer, the term of this patent is extended or adjusted under 35 U.S.C. 154(b) by 115 days.

(21) Appl. No.: 10/023,913

(22) Filed: Dec. 18, 2001

(65) Prior Publication Data

US 2002/0074105 A1 Jun. 20, 2002

(30) Foreign Application Priority Data

| Dec. 19, 2000 | (JP) | ................................. | 2000-385563 |
| Apr. 16, 2001 | (JP) | ................................. | 2001-117279 |
| Apr. 26, 2001 | (JP) | ................................. | 2001-130114 |
| Jul. 25, 2001 | (JP) | ................................. | 2001-224644 |

(51) Int. Cl.[7] ............................................. F28F 13/12
(52) U.S. Cl. ..................................... 165/52; 165/109.1
(58) Field of Search ......................... 165/43, 52, 109.1

(56) References Cited

U.S. PATENT DOCUMENTS

| 5,107,922 | A | * | 4/1992 | So ........................... 165/109.1 |
| 5,454,429 | A | * | 10/1995 | Neurauter ................. 165/109.1 |
| 5,467,815 | A | * | 11/1995 | Haumann et al. ......... 165/109.1 |
| 5,803,162 | A | | 9/1998 | Karbach et al. |
| 5,813,451 | A | * | 9/1998 | Chawla ................ 165/109.1 X |
| 5,833,389 | A | * | 11/1998 | Sirovich et al. ...... 165/109.1 X |
| 6,070,616 | A | | 6/2000 | Beck et al. |
| 6,189,607 | B1 | * | 2/2001 | Hosoya et al. ....... 165/109.1 X |
| 6,206,089 | B1 | * | 3/2001 | Uchikawa et al. ........ 165/109.1 |
| 6,247,523 | B1 | * | 6/2001 | Shibagaki et al. ............ 165/51 |
| 6,273,183 | B1 | * | 8/2001 | So et al. ................... 165/109.1 |
| 6,578,627 | B1 | * | 6/2003 | Liu et al. .................. 165/109.1 |

FOREIGN PATENT DOCUMENTS

| DE | 196 54 363 | 6/1998 |
| DE | 196 54 366 | 6/1998 |
| JP | 9-170891 | 6/1997 |
| JP | 10-193017 | 7/1998 |

* cited by examiner

Primary Examiner—Ljiljana Ciric
(74) Attorney, Agent, or Firm—Harness, Dickey & Pierce, PLC

(57) ABSTRACT

A heat exchanger includes fins (111) having a plurality of sets of two louvres (111c) substantially triangular in shape which are formed in such a manner that the distance from a flat plate portion (111a) increases progressively downstream in the gas flow direction. The two louvres (111c) of each set are arranged inwardly slanted along the gas flow direction, so that a vertical swirl is generated to draw the gas flow between the louvres (111c). The gas flowing in the vicinity of the flat plate portion (111a) and the gas flowing in the vicinity of a vertical plate portion (111b) are thus accelerated. As a result, the heat conductivity of the gas and the fins (111) is improved and the particulate matter attached on the surface of the fins (111) can be blown off, thereby preventing the clogging of the fins (111).

34 Claims, 27 Drawing Sheets

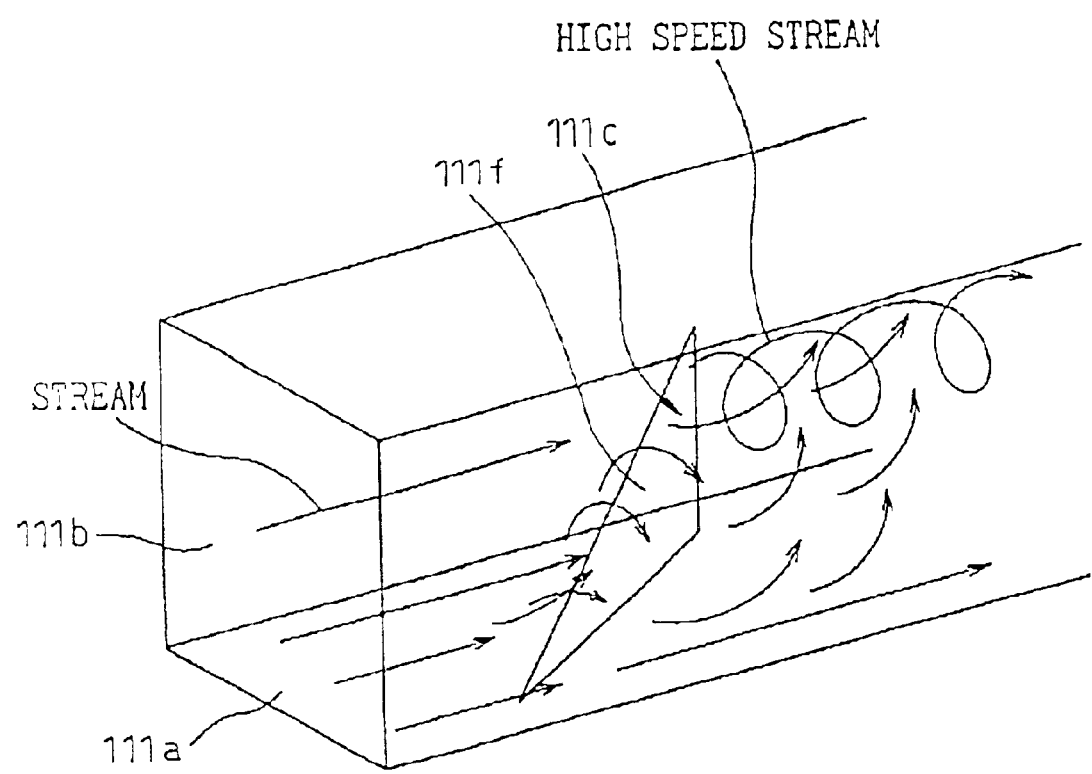

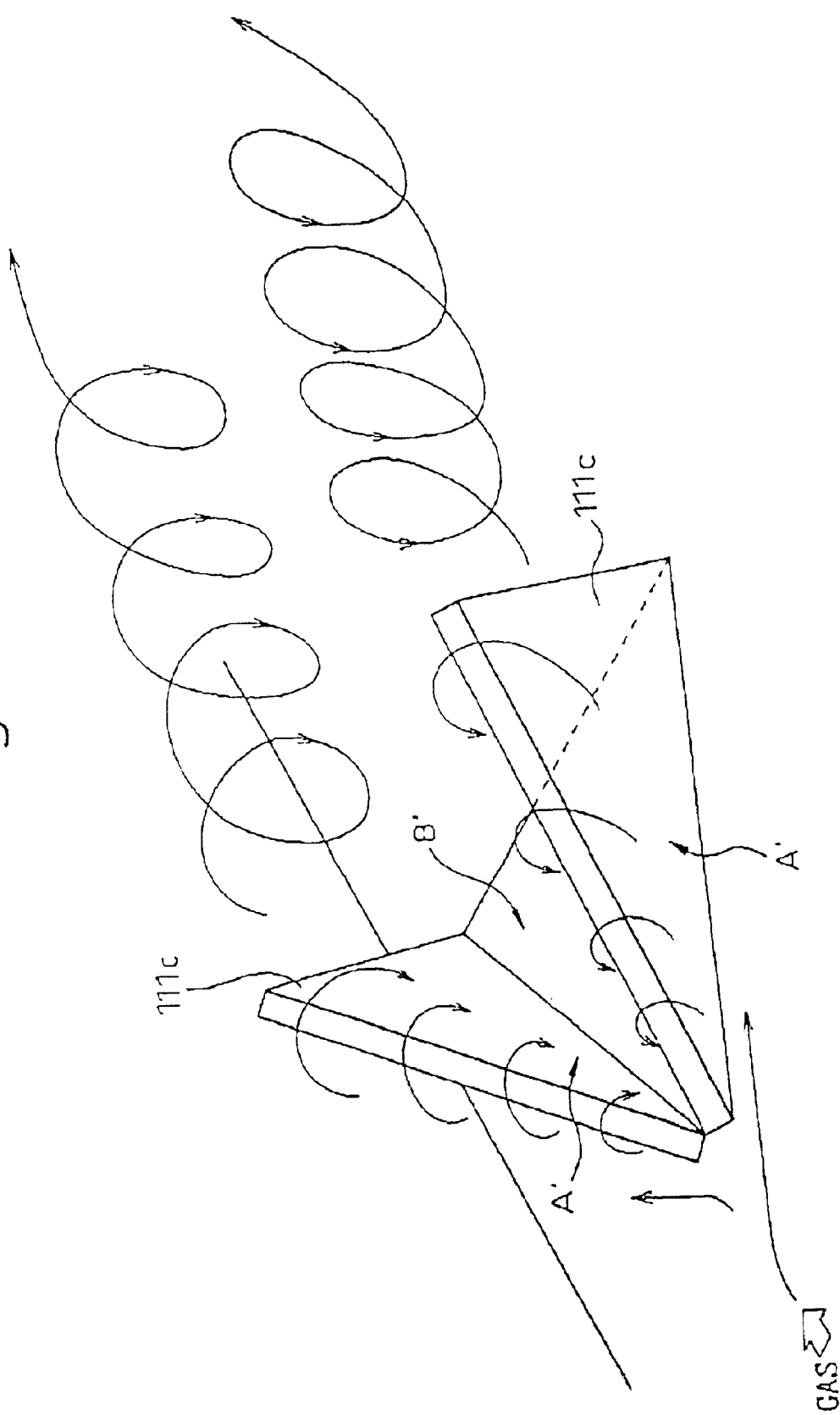

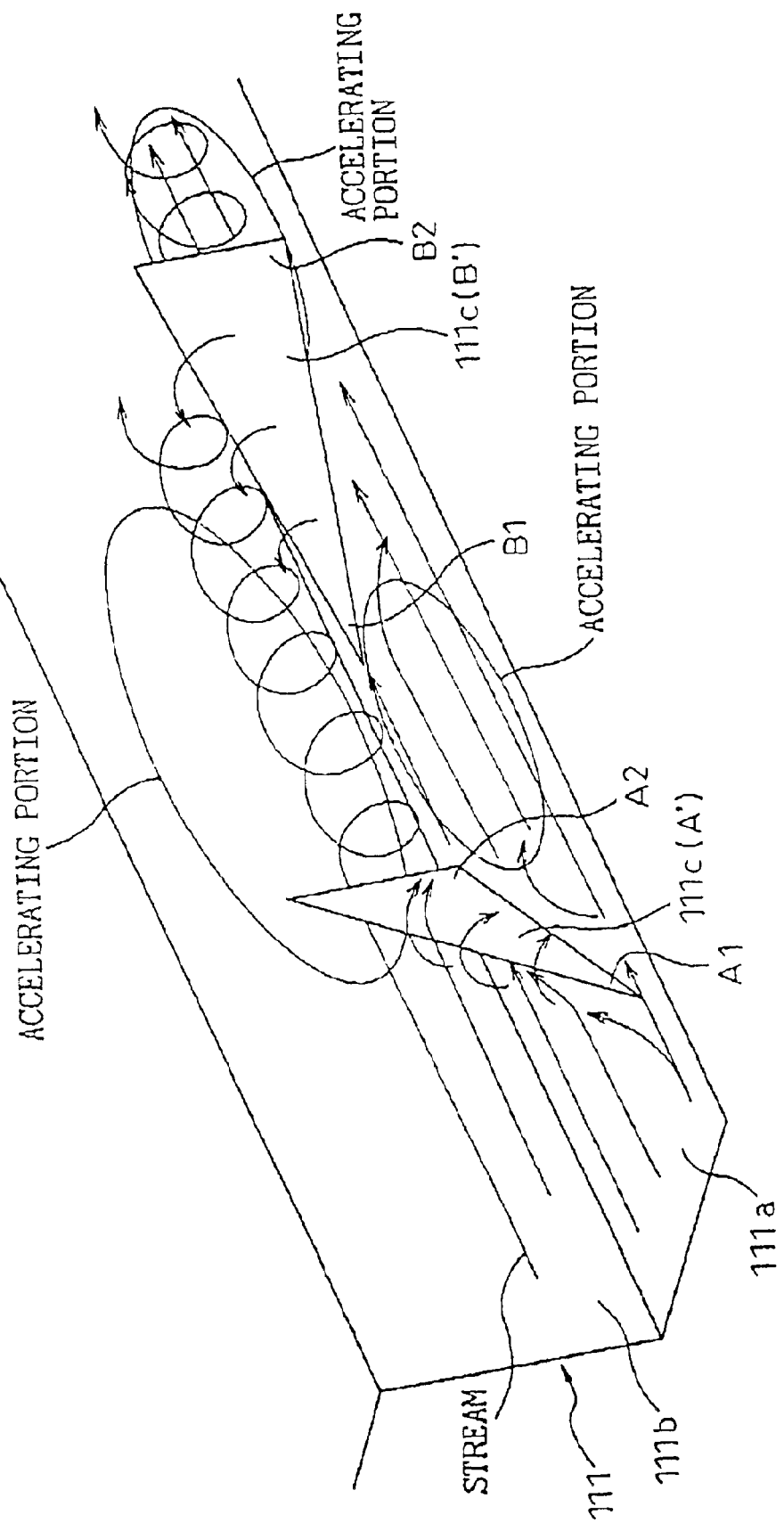

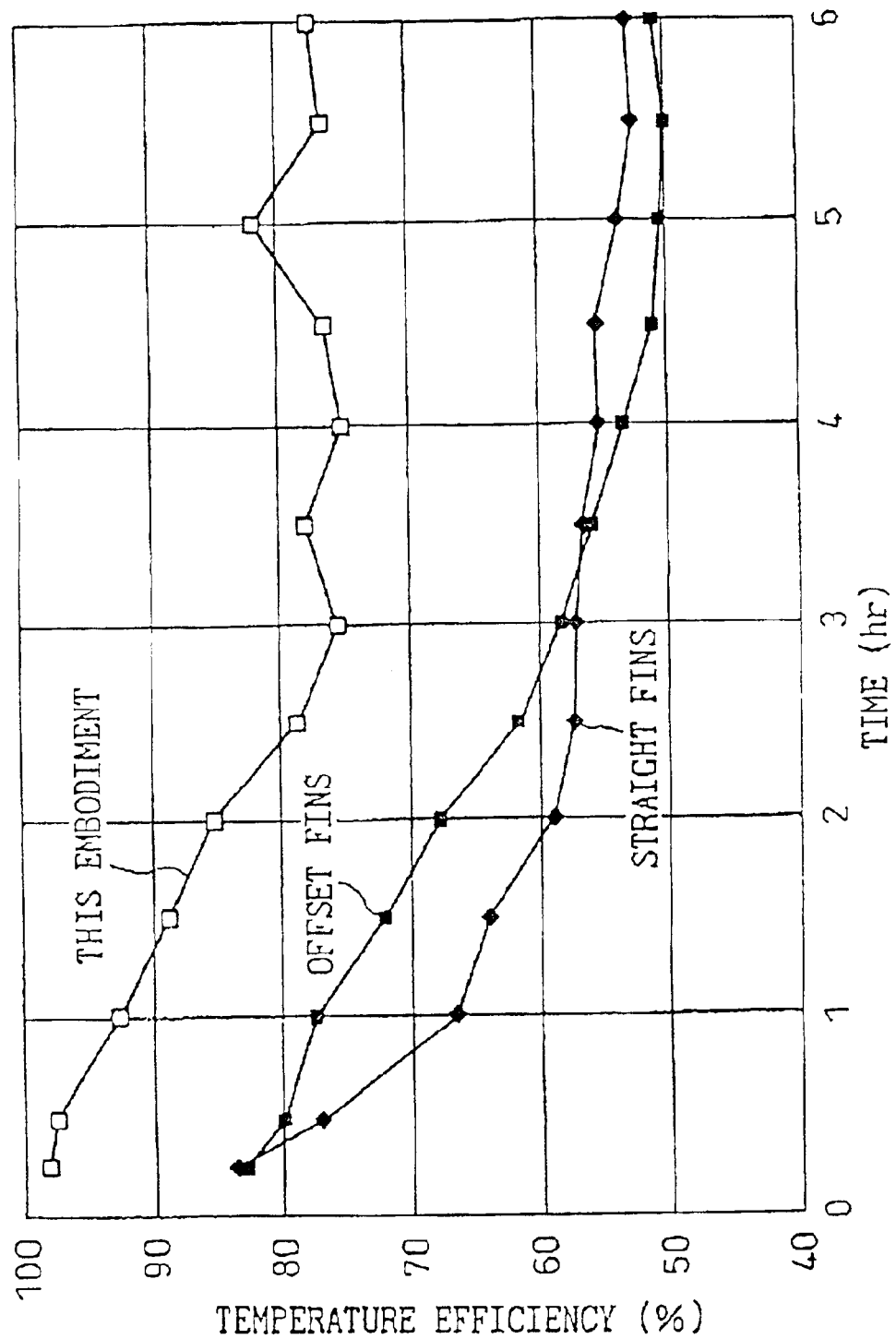

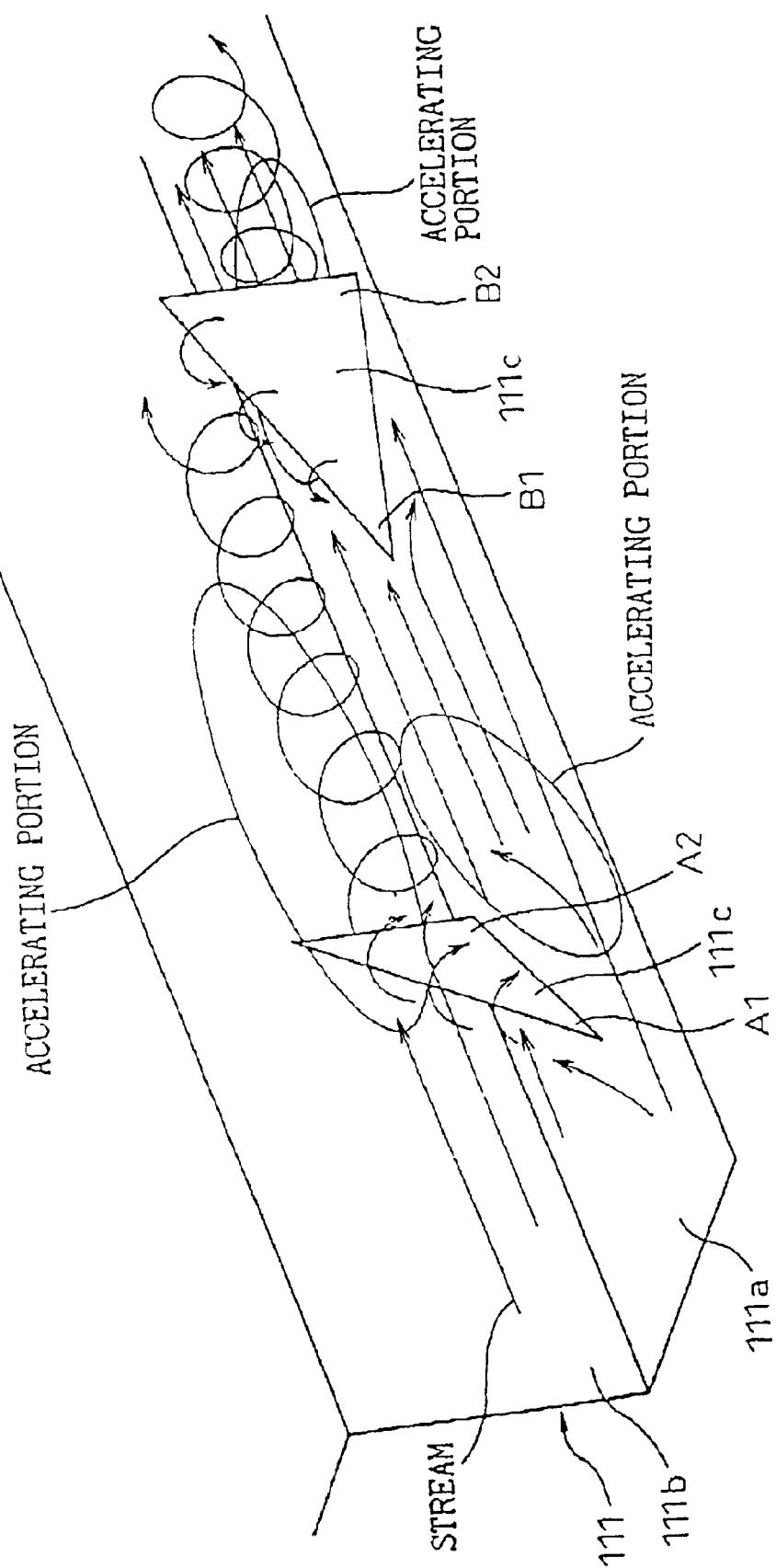

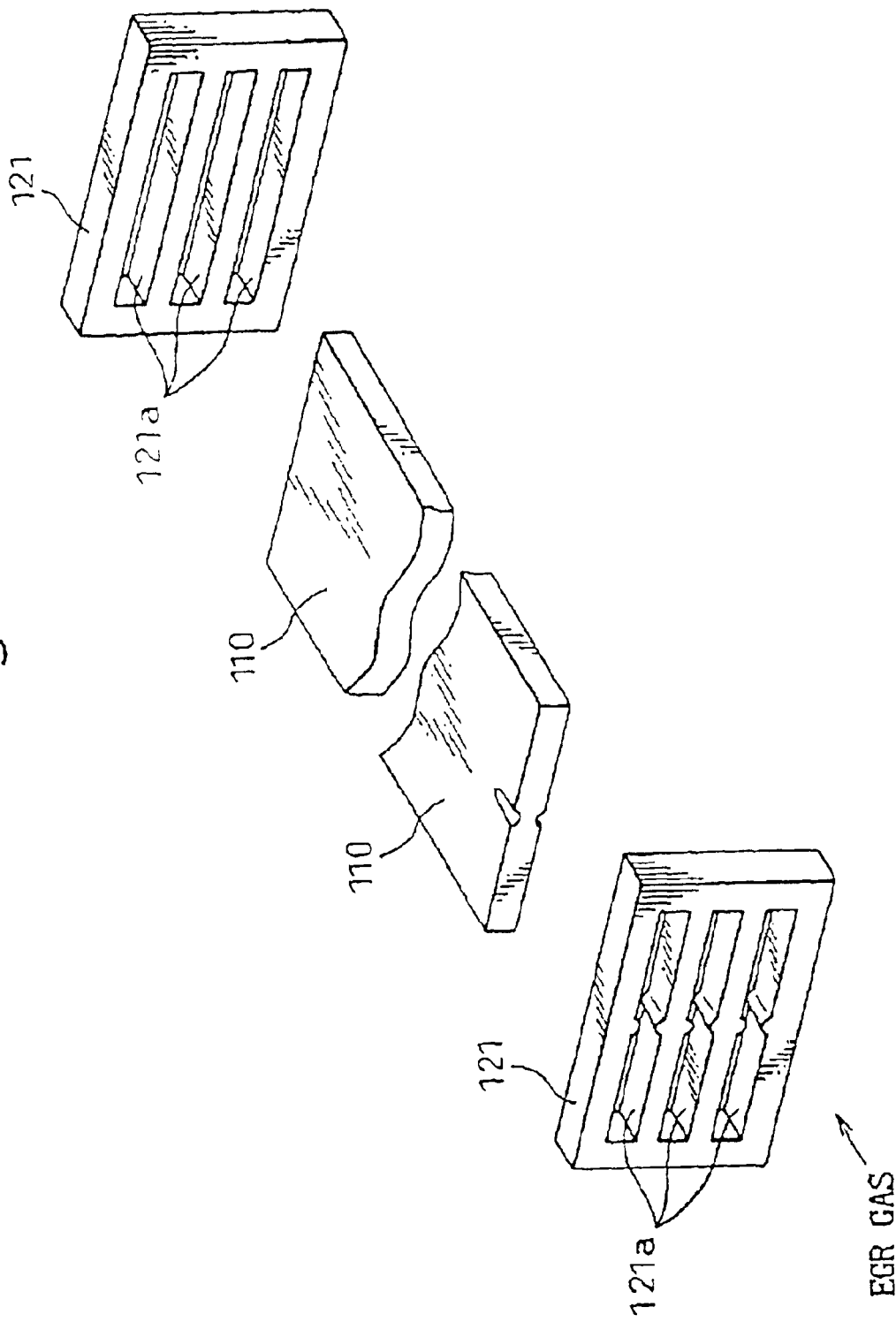

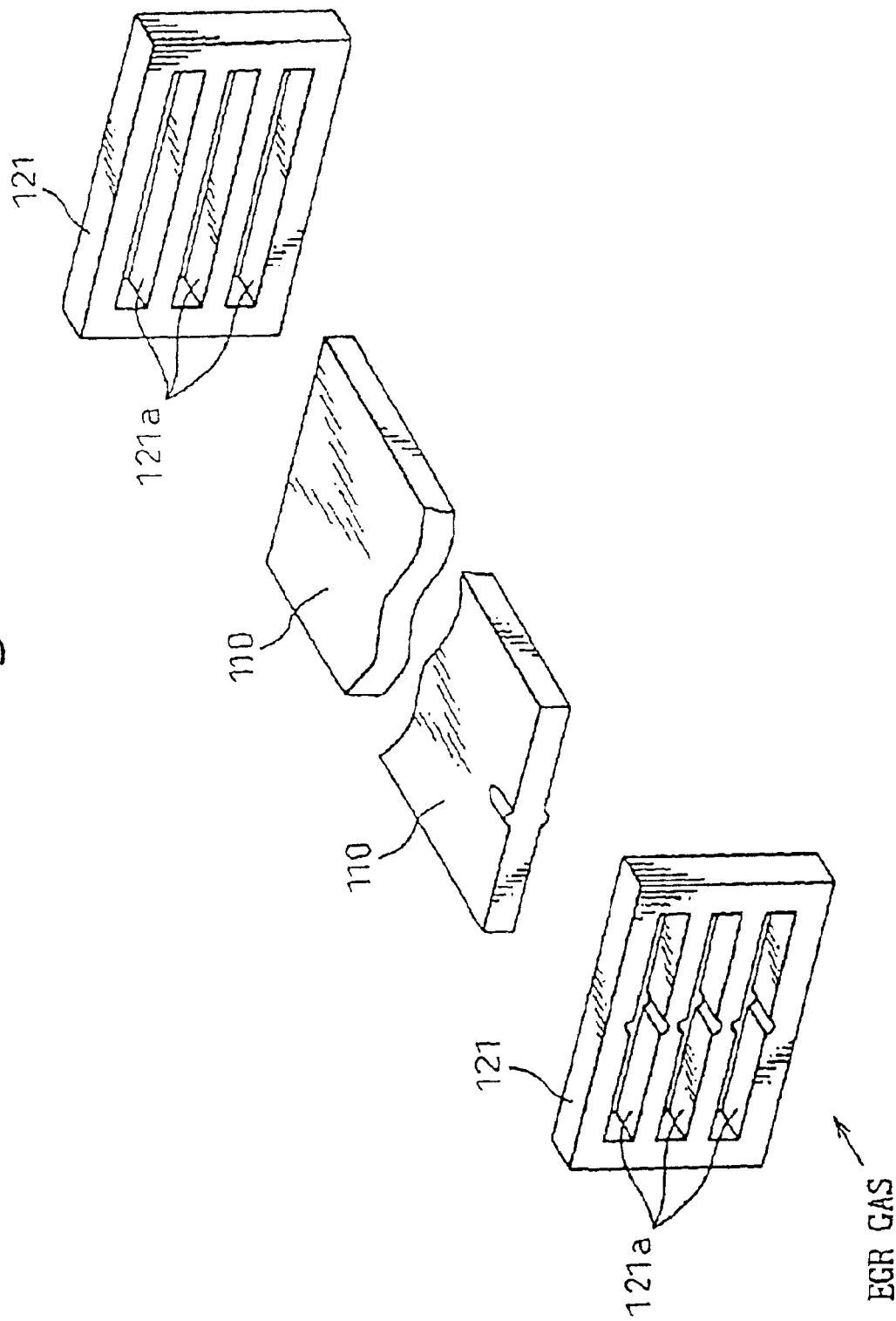

HEAT EXCHANGER

BACKGROUND OF THE INVENTION

1. Field of the Invention

The present invention relates to an exhaust gas heat exchanger for exchanging heat between the exhaust gas emitted from the internal combustion engine and a cooling fluid, which is effectively applicable to the exhaust gas recirculation (EGR) gas heat exchanger (EGR gas cooler) for cooling the exhaust gas for the EGR system.

2. Description of the Related Art

The EGR gas cooler is used for improving the effect of the EGR, i.e. the effect of reducing the nitrogen oxide in the exhaust gas by cooling the exhaust gas in EGR, and generally used to cool the exhaust gas in EGR utilizing the engine cooling water.

The present inventors have test produced and studied various EGR gas coolers. In all the working models developed, a large amount of particulates of carbon (soot) or the like are deposited on the downstream side of the EGR gas cooler in the exhaust gas flow, and the fins arranged in the exhaust gas passage are clogged, thereby very frequently posing the problem of a reduced cooling performance and an increased pressure loss.

This is by reason of the fact that the exhaust gas generated by combustion contains unburned substances such as particulate matter (soot). Accordingly, as the exhaust gas flows downstream, a decreasing temperature and a decreasing volume of the exhaust gas relatively increases the ratio of particulate matters deposited. As a result, the particulate matters easily attach to the surface of the fins. At the same time, the flow rate of the exhaust gas decreases and thereby it becomes more difficult to blow off the particulate matters attached on the surface of the fins.

The specification of U.S. patent Ser. No. 5,803,162 discloses, as shown in FIG. 30, an invention in which a plurality of sets of two inwardly slanted rectangular louvres 111c are arranged with the ends thereof having a narrower gap directed upstream in the exhaust gas flow. In the cited invention, however, particulate matter is liable to be deposited on the root of the louvres 111c for the reason described below.

Specifically, the exhaust gas that has impinged on the upstream surface of the louvres 111c in the exhaust gas flow rides over the upper end of the louvres 111c toward the downstream surface thereof, and thus flows downstream in the form of a vertical swirl.

However, the height h of the louvres 111c is such that, as shown in FIGS. 31A to 31C, the vertical swirl generated fails to circumvent the louvres 111c to the root thereof. As a result, the exhaust gas flow stagnates at the root of the louvres 111c and cannot blow off the particulate matter attached on the root. Thus, the particulate matter is deposited in an increasing amount on the root.

SUMMARY OF THE INVENTION

In view of the facts described above, the object of this invention is to provide a heat exchanger in which the fins are prevented from being clogged.

In order to achieve this object, according to this invention, there is provided a heat exchanger for exchanging heat between the exhaust gas emitted from the internal combustion engine and the cooling fluid, comprising a flat exhaust gas passage (110) allowing the exhaust gas to flow therein and fins (111) arranged in the exhaust gas passage (110) and corrugated, as viewed from the direction of the exhaust gas flow, for promoting the heat exchange between the exhaust gas and the cooling fluid, wherein a plurality of louvres (111c) are arranged on the inner wall of the exhaust gas passage (110) along the exhaust gas flow in such a manner that the distance between the surface (111f) of each of the louvres (111c) and the inner wall of the exhaust gas passage (110) increases progressively downstream in the exhaust gas flow. Further, the surface (111f) of the louvres (111c) forms an angle to the direction of the exhaust gas flow.

As a result, the exhaust gas that has impinged on the downstream side of the upstream surface of the louvres (111c), and rides over the upper end thereof, circumvents the louvres (111c) toward the downstream surface thereof in the EGR gas flow and fails to reach the root of the louvres (111c) as in the invention described in the cited specification. The exhaust gas that has impinged on the upstream side of the upstream surface of the louvres (111c) and rides over the upper end thereof, circumvents the louvres (111c) toward the downstream surface thereof in the EGR gas flow. However, it reaches the root of the louvres (111c) since the height of the louvres (111c) is small.

The exhaust gas that has reached the root of the louvres (111c) is drawn into the exhaust gas stream narrowed and increased in speed by flowing in the gap between the louvres (111c) and the fins (111), and thus flows to the downstream side of the louvres (111c) along the root thereof.

Consequently, the flow rate of the exhaust gas is increased at the root of the louvres (111c), and the particulate matter attached on the root can be blown off, thereby making it possible to prevent the particulate matter from being deposited on the root.

The present invention may be more fully understood from the description of preferred embodiments of the invention, as set forth below, together with the accompanying drawings.

BRIEF DESCRIPTION OF THE DRAWINGS

FIG. 7 is a diagram for explaining the effect of the inner fins according to the first embodiment of the invention.

FIGS. 8B, 8C are sectional views taken along line a—a and line b—b in FIG. 8, respectively.

FIG. 9 is a schematic diagram showing an EGR gas flowing on the inner fins according to the first embodiment of the invention.

FIG. 18 is a schematic diagram showing an EGR gas (exhaust gas stream) flowing on the inner fins according to the third embodiment of the invention.

FIG. 19 is a graph showing the relation between the temperature efficiency and the time during which the EGR gas (exhaust) is allowed to flow through the gas cooler.

FIG. 21 is a schematic diagram showing an EGR gas (exhaust gas stream) flowing on the inner fins according to the fourth embodiment of the invention.

FIG. 27 is a schematic diagram showing the feature of a gas cooler according to a ninth embodiment of the invention.

FIG. 28 is a schematic diagram showing the features of a gas cooler according to the ninth embodiment of the invention.

DESCRIPTION OF THE PREFERRED EMBODIMENTS

First Embodiment

Figure 1:
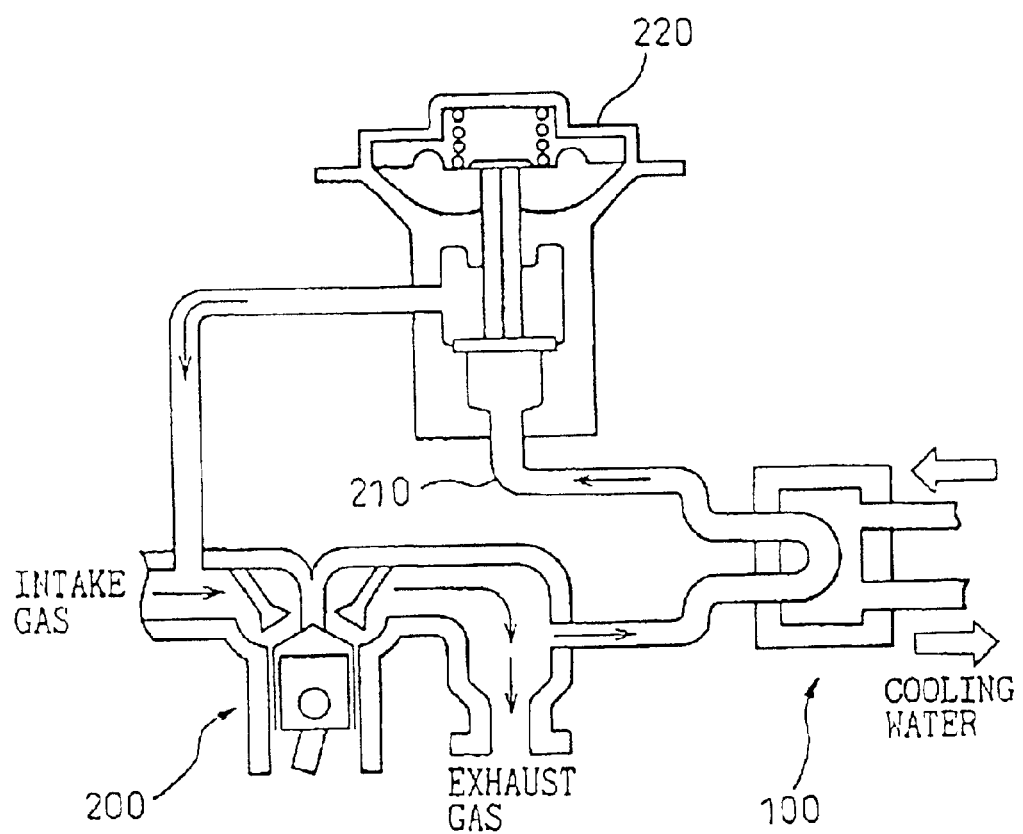
FIG. 1 is a schematic diagram showing an EGR gas cooling system using a gas cooler according to a first embodiment of the invention.

This embodiment represents an application of a exhaust gas heat exchanger, according to the invention, to the EGR gas cooler for a diesel engine. FIG. 1 is a schematic diagram showing an EGR (exhaust gas recirculation) system using an EGR gas cooler 100 (hereinafter referred to as "the gas cooler") according to the first embodiment.

In FIG. 1, an exhaust gas recirculation pipe 210 is for recirculating part of the exhaust gas emitted from the engine 200 to the intake side of the engine 200. An EGR valve 220 is well known means arranged in the exhaust gas flow of the exhaust gas recirculation pipe 210 for regulating the amount of the EGR gas in accordance with the operating condition of the engine 200. The gas cooler 100 is arranged between the exhaust side of the engine 200 and the EGR valve 220 for cooling the EGR gas by heat exchange between the EGR gas and the cooling water.

Now, the structure of the gas cooler 100 swill be explained.

Figure 2:
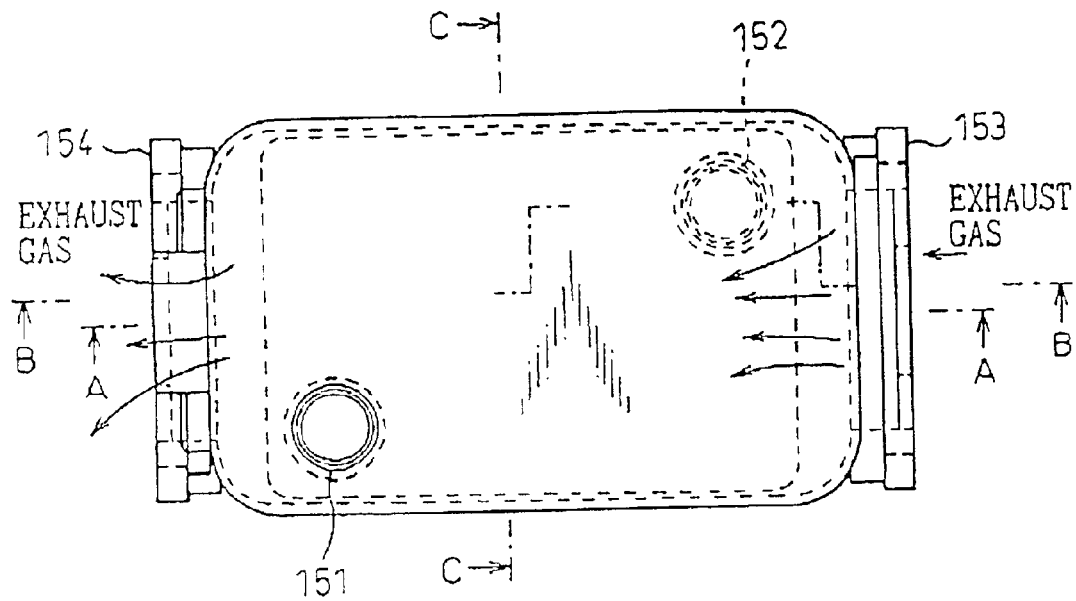
FIG. 2 is a diagram showing an outline of a gas cooler 100 according to the first embodiment of the invention.
Figure 3:
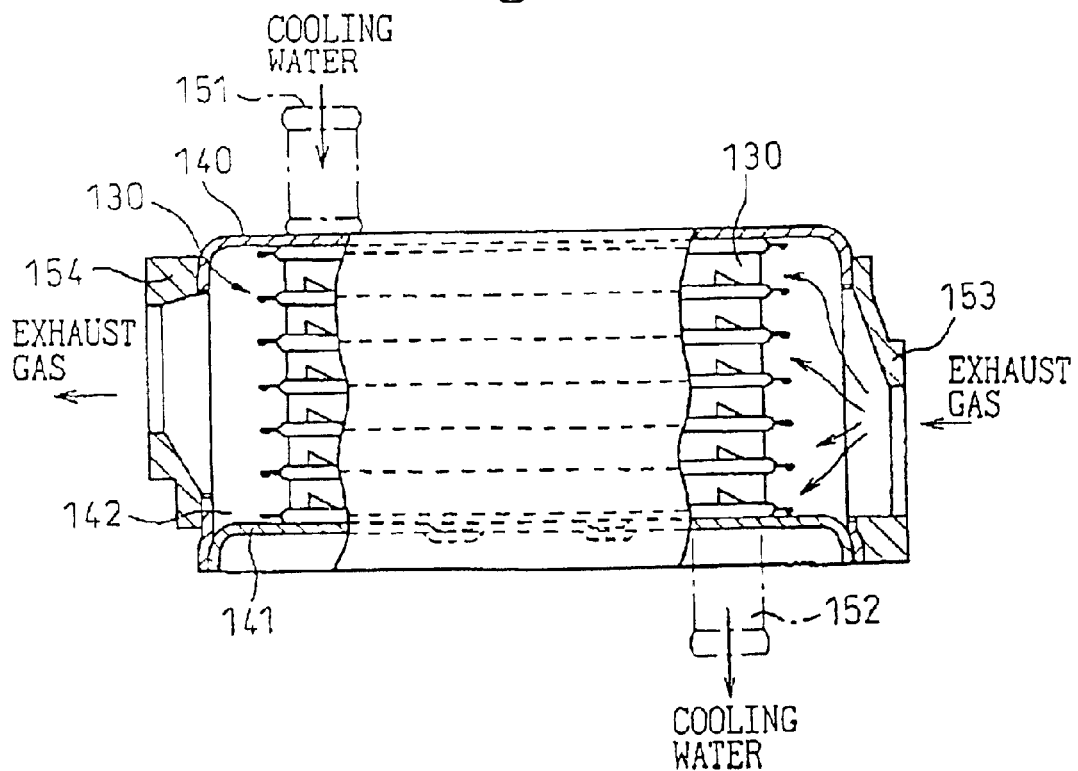
FIG. 3 is a sectional view taken along line A—A in FIG. 2.
Figure 4:
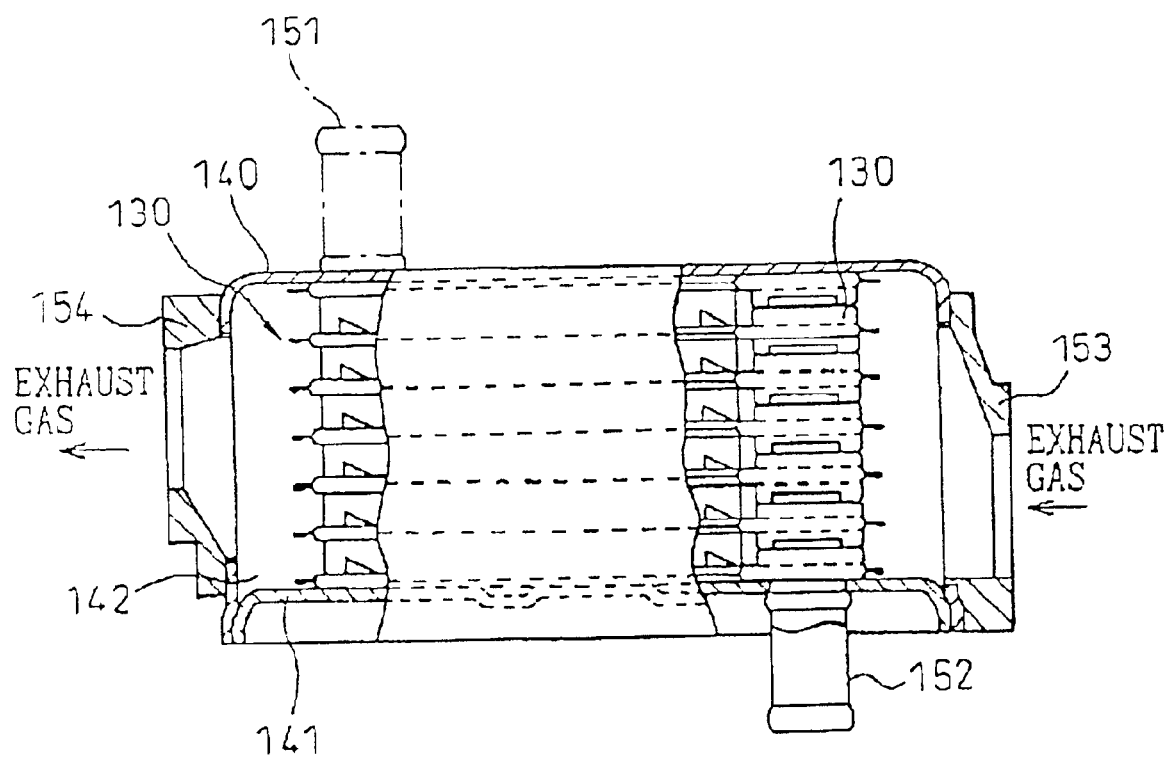
FIG. 4 is a sectional view taken along line B—B in FIG. 2.
Figure 5:
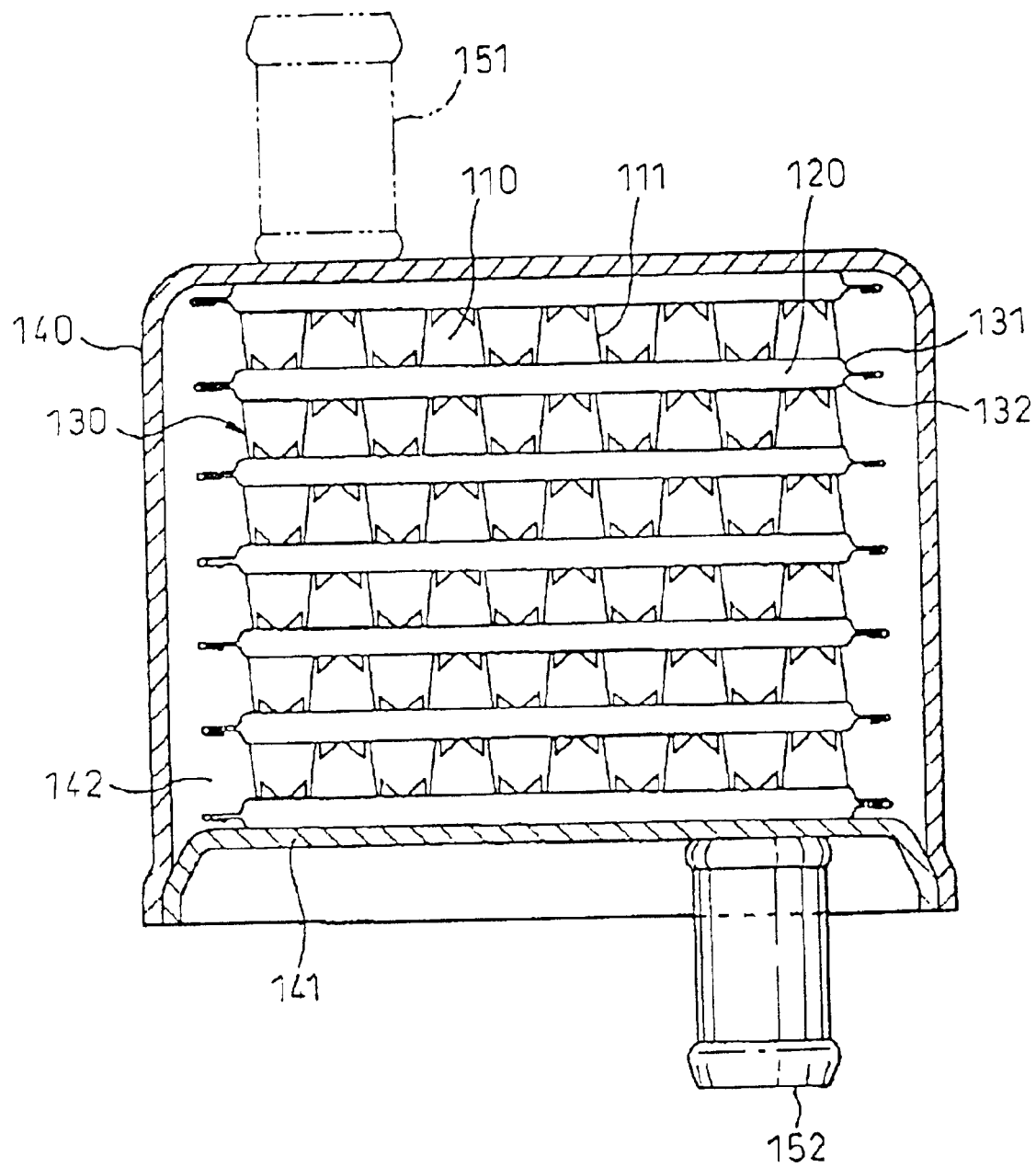
FIG. 5 is a sectional view taken along line C—C in FIG. 2.

FIG. 2 is a diagram showing an outline of the gas cooler 100, FIG. 3 a sectional view taken along line A—A in FIG. 2, FIG. 4 a sectional view taken along line B—B in FIG. 2 and FIG. 5 a sectional view taken along line C—C in FIG. 2. In FIGS. 3 to 5, an exhaust gas passage 110 is for allowing the EGR gas to flow therein, and a is cooling water passage 120 is for allowing the cooling water to flow therein.

The cooling water passage 120 is a flat tube including a plurality of sets of two laminate plates 131, 132 making up defining members stamped to a predetermined shape, which sets are arranged one on another along the thickness direction of the tube (vertically in the page). these sets of the laminate plates 131, 132 and the inner fins 111 are arranged alternately thereby to constitute a heat exchange core 130 for exchanging heat between the EGR gas and the cooling water.

A core tank 140 is a box-shaped means for accommodating the heat exchange core 130, and a core cap 141 is a plate for closing an opening 142 formed in the core tank 140 for building in the heat exchange core 130. The core cap 141 is coupled by being fitted in the core tank 140 in contact with the inner wall of the core tank 140.

The exhaust gas passage 110 is configured of the spaces defined by the laminate plates 131, 132 making up the cooling water passage 120. The section of the exhaust gas passage 110, therefore, is also substantially flat.

According to this embodiment, the laminate plates 131, 132, the core tank 140 and the core cap 141 are made of stainless steel having a high corrosion resistance, and brazed to each other by a brazing filler material of an Ni group.

As shown in FIG. 3, for example, the inner fins 111 of stainless steel for promoting the heat exchange between the EGR gas and the cooling water by increasing the area of contact with the EGR gas are arranged in the exhaust gas passage 110. Each of the inner fins 111, as shown in FIGS. 5 and 6A, is formed in the shape of a rectangular wave including, as viewed in the direction of the EGR gas flow, a plurality of flat plate portions 111a substantially parallel to the long diameter of the exhaust gas passage 110 and a plurality of vertical plate portions (side wall portions) 111b extending in the direction crossing the flat plate portions 111a.

Figure 6A:
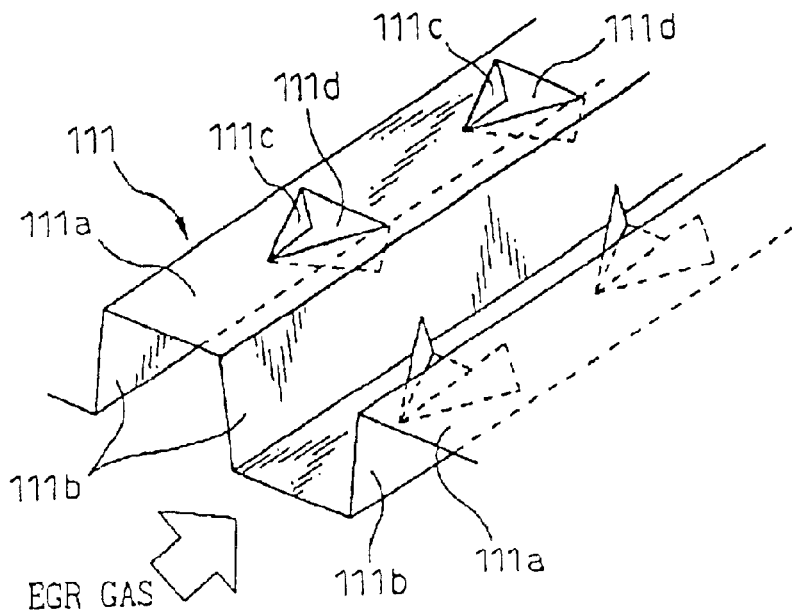
FIG. 6A is a perspective view of an inner fin according to the first embodiment of the invention, FIG. 6B a side view of an inner fin according to the first embodiment of the invention, and FIG. 6C a front view of an inner fin according to the first embodiment of the invention.
Figure 6B:
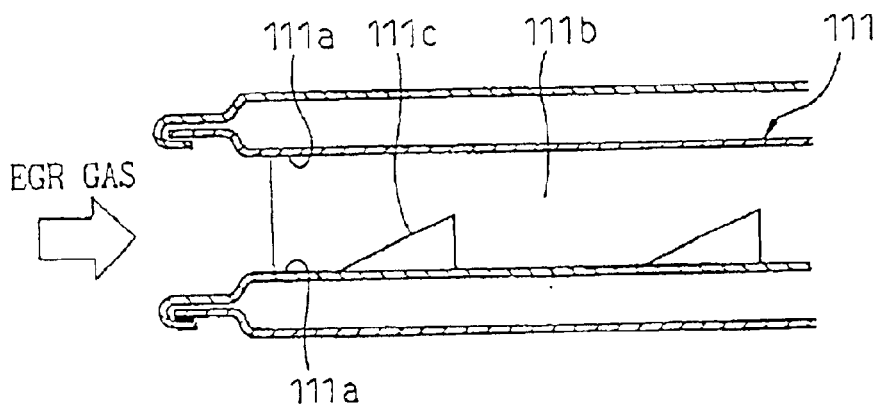

Each flat plate portion 111a, as shown in FIG. 6A, is formed with a plurality of sets of two louvres 111c along the downstream direction in the exhaust gas flow. The louvres 111c each have a substantially triangular surface 111f formed by cutting a part thereof in two opposite directions in such a manner that the distance from the flat plate portion 111a increases progressively downstream in the EGR gas flow.

Figure 6C:
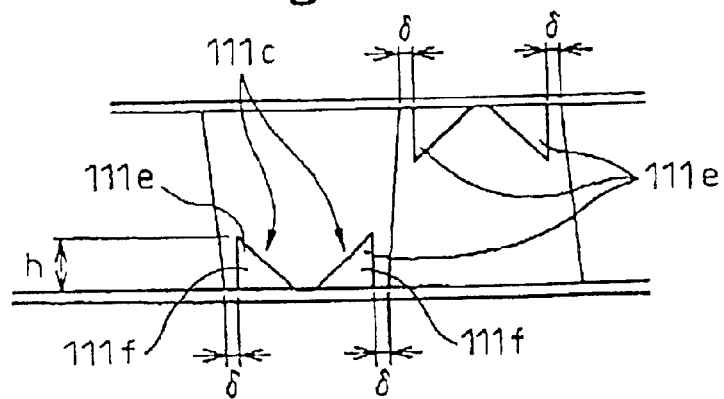

In the process, the two louvres 111c making up each set of the louvres 111c, as shown in FIG. 6A, are arranged in an inwardly slanted fashion so that the distance between the louvres 111c increases progressively downstream in the exhaust gas flow. At the same time, a hole 111d formed between the two louvres 111c of each louvre set when cutting up the louvres 111c from the flat plate portion 111a, as shown in FIG. 6C, is such that one surface of the flat plate opposite to the other surface thereof where the louvres 111c are cut from the flat plate portion 111a is closed by being brought into contact with the inner wall of the exhaust gas passage 110, i.e. the outer wall of the cooling water passage 120.

Incidentally, in FIGS. 2 to 4, a cooling water introduction pipe portion 151 is for introducing the cooling water into the heat exchange core 130, and a cooling water discharge pipe portion 152 is for discharging the cooling water after heat exchange, Also, an exhaust gas introduction joint portion 153 is for introducing the exhaust gas into the core tank 140, and an exhaust gas discharge joint portion 154 is for discharging the exhaust gas after heat exchange.

Now, the features of this embodiment will be explained.

According to this embodiment, the louvre 111c is formed substantially as a triangle having a surface 111f the distance of which, from the inner wall of the exhaust gas passage, increases progressively downstream in the EGR gas flow, and the surface 111f of the louvre 111c is formed at an angle to the direction in which the EGR gas flows. As shown in FIG. 7, therefore, the exhaust gas that has impinged on the upstream surface of the louvre 111c in the EGR gas flow rides over the upper end of the louvre 111c toward the downstream surface of the louvre 111c in the EGR gas flow, and thus flows downstream as a vertical swirl.

The vertical swirl is defined as a vortex which appears to whirl around in the plane perpendicular to the EGR gas flow as viewed from the direction of the EGR gas flow.

According to this embodiment, the louvre 111c is formed substantially as a triangle having a surface 111f the distance of which from the inner wall of the exhaust gas passage increases progressively downstream in the EGR gas flow. Therefore, the vertical swirl that has impinged on the downstream side of the upstream surface 111f of the louvre 111c in the EGR gas flow and has circumvented by riding over the upper end of the louvre 111c to the downstream surface of the louvre 111c in the EGR gas flow fails to reach the root of the louvre 111c as shown in FIG. 8C, since the height of the louvre 111c is large. The vertical swirl that has impinged on the upstream side of the upstream surface 111f of the louvre 111c in the EGR gas flow and has ridden over the upper end of the louvre 111c to the downstream surface of the louvre 111c in the EGR gas flow. However, it reaches the root of the louvre 111c as shown in FIG. 8B, since the height of the louvre 111c is small.

Figure 8A:
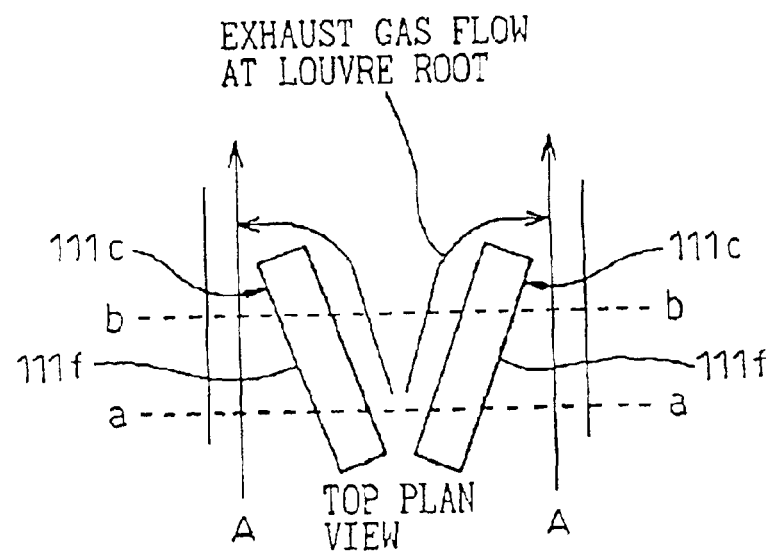
FIGS. 8A to 8C are diagrams for explaining the effect of inner fins according to the first embodiment of the invention.
Figure 8B:
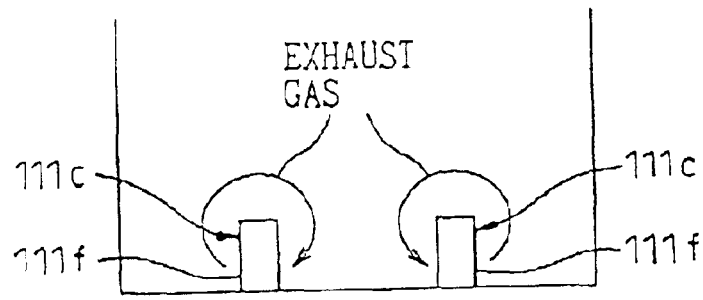
Figure 8C:
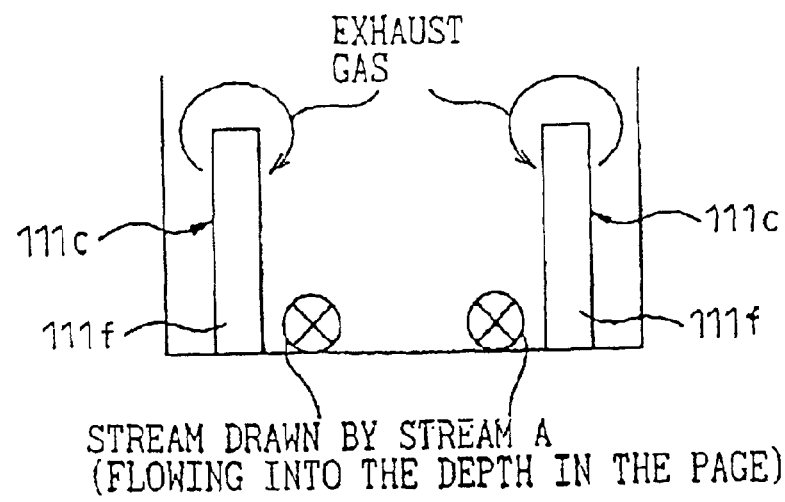

The EGR gas flow that has reached the root of the louvre 111c, as shown in FIGS. 7 and 8A, is drawn into the EGR gas flow A which has been increased in speed by being reduced while flowing through the gaps between each louvre 111c and the vertical plate portion (side wall portion) 111b and flows downstream along the root of the louvre 111c.

As a result, the EGR gas flow increases in speed at the root of the louvre 111c, and thus can blow off the particulate matter attached on the root of the louvre 111c, thereby preventing the particulate matter from being deposited on the root.

Also, in view of the fact that the louvre 111c is formed substantially as a triangle with the distance increased from the flat plate portion 111a progressively downstream in the EGR gas flow and that a plurality of sets of two inwardly slanted louvres 111c are arranged along the EGR gas flow in such a manner that the distance between the two louvres 111c increases progressively downstream in the EGR gas flow, the EGR gas flowing in the exhaust gas passage 110 branches into at least two streams by being guided as it impinges on each set of the two inwardly slanted louvres 111c as shown in FIG. 9.

In the process, the exhaust gas pressure on the surface A' of the louvre 111c impinged on by the EGR gas becomes higher than the exhaust gas pressure on the opposite surface B'. Therefore, part of the branch streams of the exhaust gas rides over the louvre 111c and flows to the downstream surface B' lower in exhaust gas pressure in the EGR gas flow, i.e. between the two louvres 111c of the louvre set. Thus, a vertical swirl for drawing the branch EGR gas streams between the louvres 111c is generated on the sides of the vertical plate portions 111b symmetrically about the main stream flowing substantially in the central portion of the exhaust gas passage 110.

The EGR gas flowing in the vicinity of the flat plate portion 111a is accelerated as it is drawn between the louvres 111c by the vertical swirl. Thus, the EGR gas flowing in the vicinity of each flat plate portion 111a increases in speed as compared with the EGR gas assumed to flow along the simple corrugated straight fins having no louvres 111c. In similar fashion, the EGR gas flowing in the vicinity of each vertical plate portion (side wall portion) 111b is accelerated by the vertical swirl and increases in speed as compared with the EGR gas assumed to flow along the simple corrugated straight fins having no louvres 111c.

Further, the heat conductivity of both the EGR gas and the fins 111 can be improved while at the same time making it possible to blow off the particulate matter attached to the surface of the fins 111. In this way, the fins 111 are prevented from being clogged for an improved heat exchange efficiency of the gas cooler.

Figure 10A:
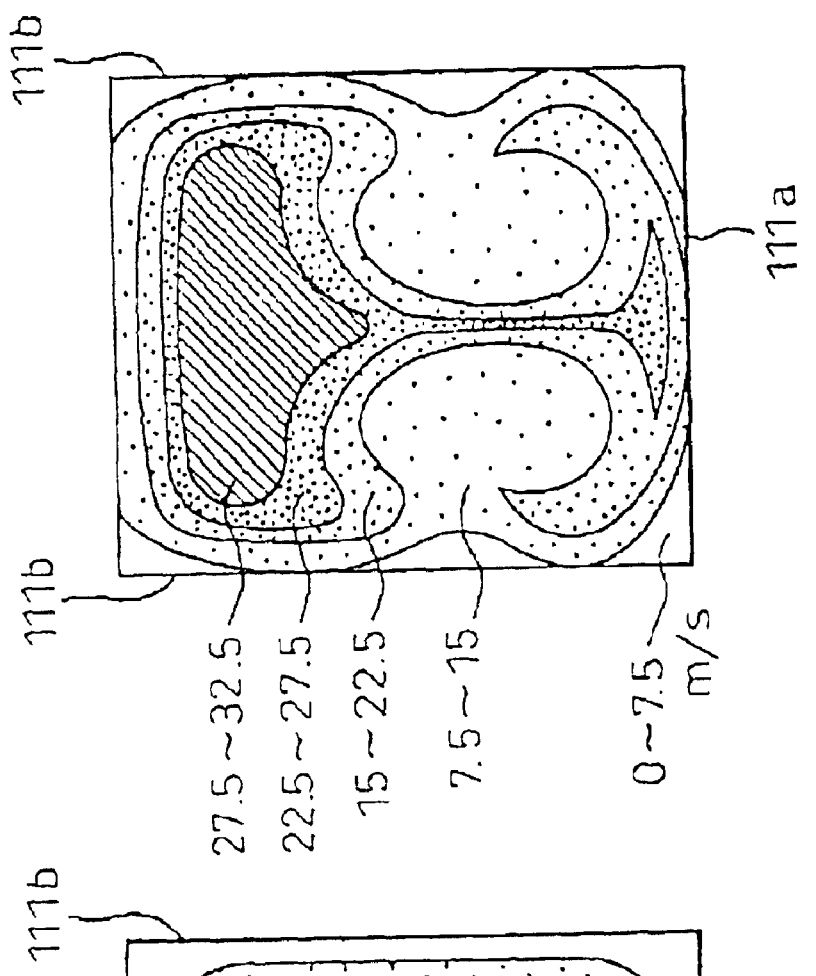
FIG. 10A is a schematic diagram showing the distribution of the flow rate of the EGR gas (exhaust gas flow) flowing on the inner fins according to the first embodiment of the invention.
Figure 10B:
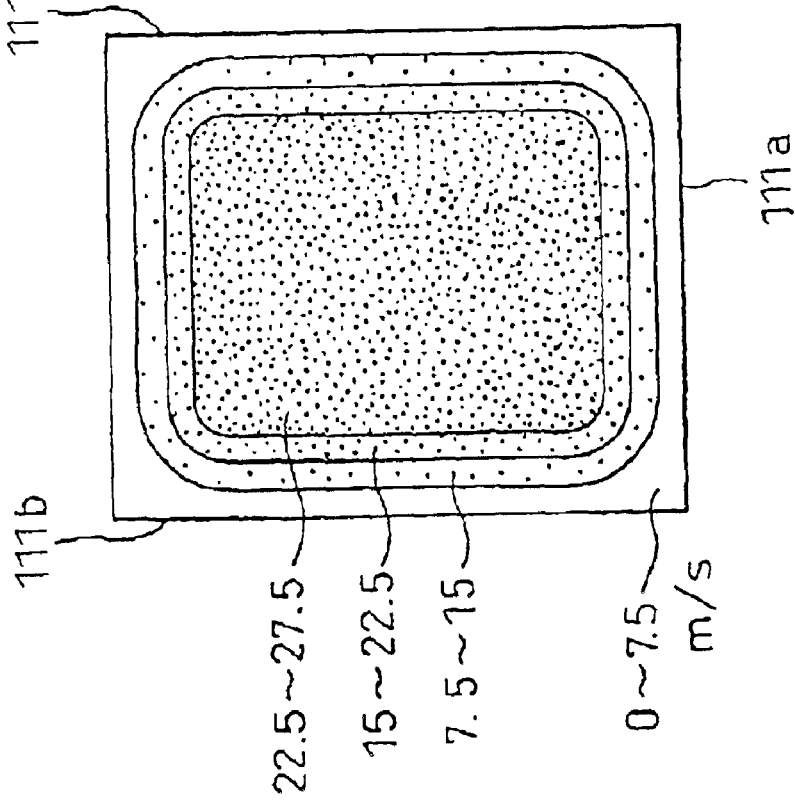
FIG. 10B is a schematic diagram showing the distribution of the flow rate of the EGR gas (exhaust gas flow) flowing on straight fins.
Figure 11:
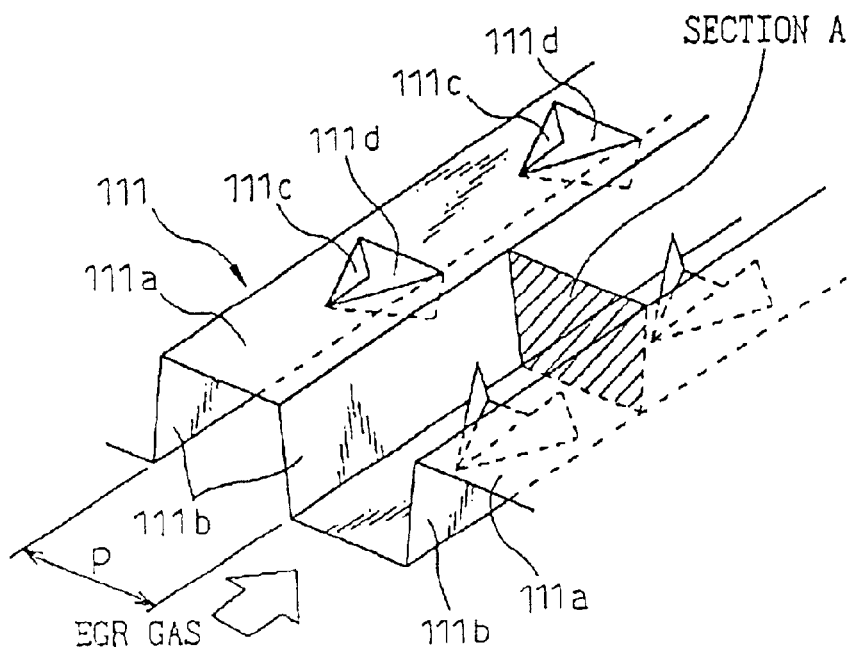
FIG. 11 is a perspective view of an inner fin according to the first embodiment of the invention.

FIG. 10A shows the distribution of the flow rate of the EGR gas in the section hatched in FIG. 11, and FIG. 10B shows the distribution of the flow rate of the EGR gas in the case where the straight fins are employed. As is obvious from these flow rate distribution diagrams, the flow rate of the EGR gas flowing in the vicinity of the flat plate portion 111a and the flow rate of the EGR gas flowing in the vicinity of the vertical plate portion (side wall portion) 111b of the gas cooler 100 according this embodiment are higher than the corresponding flow rates for the gas cooler having straight fins.

In the gas cooler 100 according to this embodiment, the flow rate is reduced at the central portion of the vertical swirl. This has substantially no practical effect since the particular central portion is distant from the flat plate portion 111a and the vertical plate portion (side wall portion) 111b.

According to this embodiment, as described above, the exhaust gas flowing in the exhaust gas passage 110 is made to branch by the louvres 111c, and the branched EGR gas stream is drawn between the louvres 111c by the differential pressure generated between the upstream, side and the downstream side of the louvres 111c in the EGR gas flow. In this way, a vertical swirl is generated so that the flow rate distribution in the exhaust gas passage 110 is positively changed and the exhaust gas flowing in the vicinity of the vertical plate portion (side wall portion) 111b is accelerated. In the event that the distance between the louvres 111c and the vertical plate portion 111b increases excessively, however, the exhaust gas flowing in the vicinity of the vertical plate portion 111b may not be sufficiently accelerated.

In view of this, according to this embodiment, the distance 6 between the downstream end portion 111e of the louvres 111c and the vertical plate portion (side wall portion) 111b is set to a figure larger than the maximum cut-up height h (FIG. 6c) of the louvres 111c by a factor of not less than 0.5 but not more than unity, to make sure that the EGR gas flowing in the vicinity of each vertical plate portion 111b is accelerated sufficiently.

Figure 12:
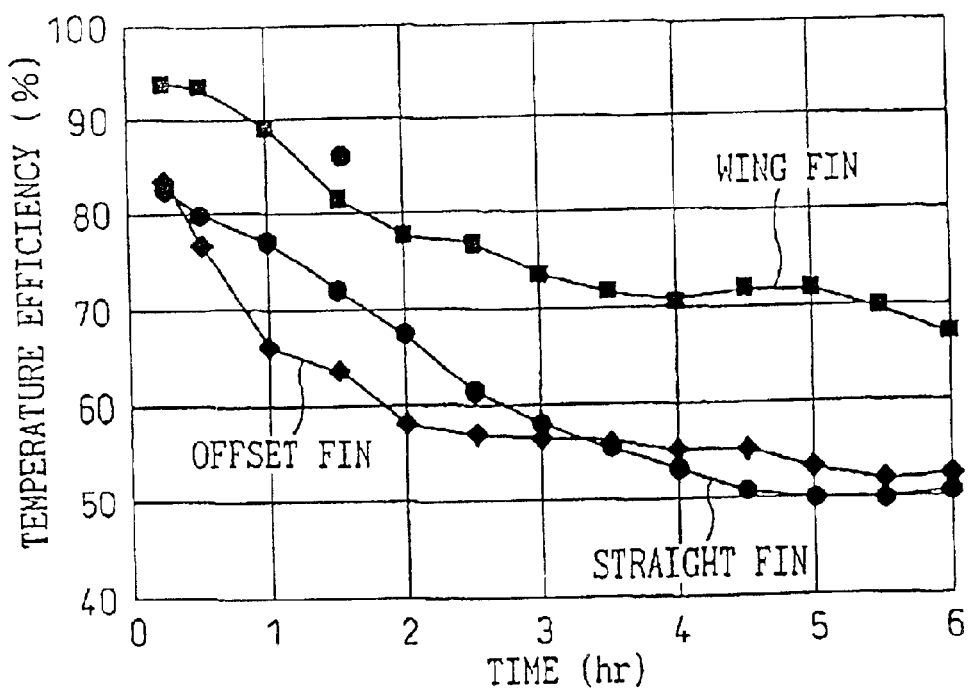
FIG. 12 is a graph showing the relation between the temperature efficiency and the time during which the EGR gas (exhaust gas) is allowed to flow through the gas cooler.

FIG. 12 is a graph showing the relation between the temperature efficiency of the inner fins 111 according to this embodiment, the offset inner fins or the straight fins configured of the inner fins 111 according to this embodiment, lacking the louvres 111c, on the one hand and the time during which the EGR gas is rendered to flow in the gas cooler 100, on the other hand. As apparent from the graph, the inner fins 111 according to this embodiment have a higher initial temperature efficiency and a lower rate of decrease in heat exchange efficiency than the other inner fins.

The temperature efficiency is defined by the formula (inlet gas temperature—outlet gas temperature)/(inlet gas temperature—inlet water temperature). The offset fins, on the other hand, include a plurality of tabular segments (vertical plate portions 111b) arranged in a staggered fashion.

Figure 13:
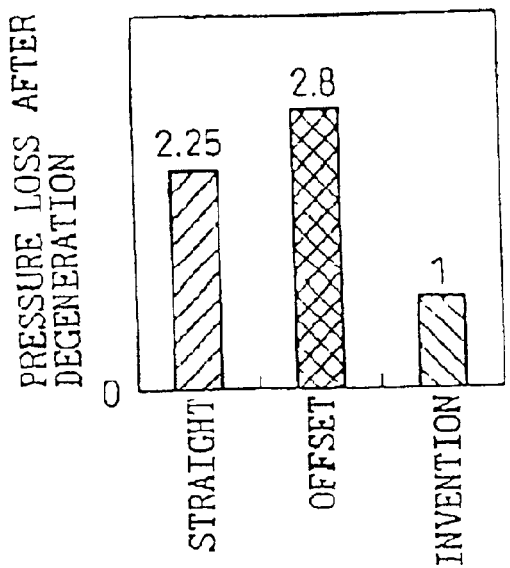
FIG. 13 is a graph showing the pressure loss of the gas cooler after the particulate matters are deposited as the result of allowing the EGR gas to flow through the gas cooler 100 for six hours.
Figure 14:
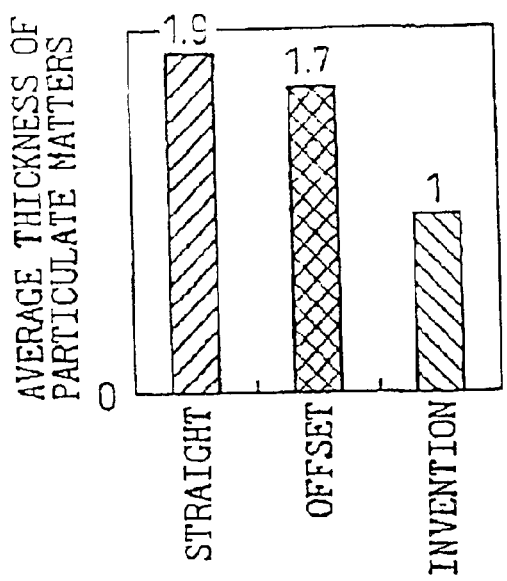
FIG. 14 is a graph showing the amount (thickness) of the particulate matter deposited after allowing the EGR gas to flow through the gas cooler 100 for six hours.

FIG. 13 shows the pressure loss of the gas cooler 100 after the EGR gas is allowed to flow through the gas cooler 100 for six hours with the particulate matters deposited. FIG. 14 shows the thickness of the particulate matters deposited in the case where the EGR gas is allowed to flow through the gas cooler 100 for six hours. As is evident from FIGS. 13 and 14, according to this embodiment, the amount of the particulate matters deposited on the inner fins ill can be reduced.

The reference "Journal of Heat Transfer, Vol. 116, Nov. 94", pp. 880–885, FIG. 1(c), also discloses fins having triangular louvres. In the fins described in the cited reference, however, the holes formed by cutting the louvres are located outside the set of louvres unlike in the present embodiment. In the assumed case, where the vertical plate portion is formed on other than the holes, therefore, the pitches of the fins 111, i.e. the distance (FIG. 11) p between adjacent vertical plate portions 111b and the distance from the vertical swirl to the vertical plate portion 111b are necessarily increased.

The increased pitch p of the fins 111 and the increased distance from the vertical swirl to the vertical plate portion (side wall portion) 111b reduces the total surface area of the fins 111 and makes it impossible to sufficiently accelerate the EGR gas flowing in the vicinity of the vertical plate portions 111b. The heat exchange efficiency of the gas cooler 100 is thus reduced. It is therefore difficult to improve the heat exchange efficiency of the gas cooler 100 with the louvres described in the cited reference.

Second Embodiment

Figure 15A:
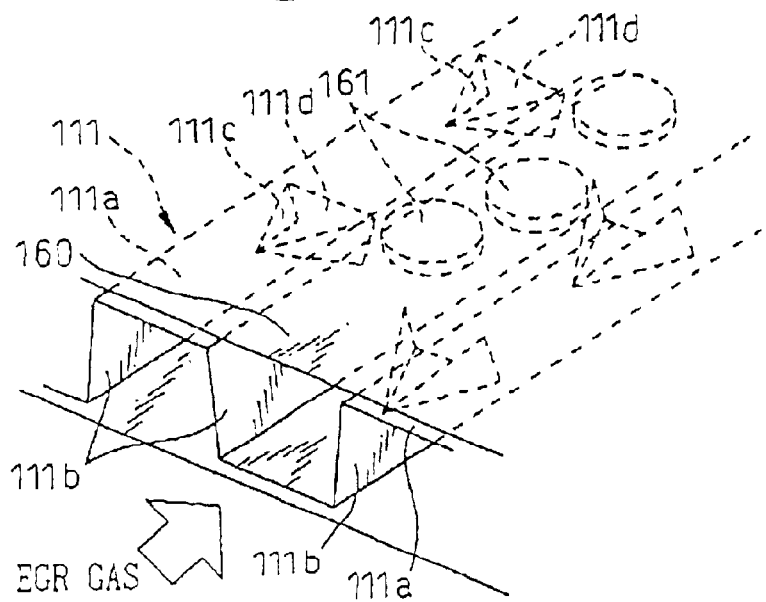
FIG. 15A is a perspective view of an inner fin according to a second embodiment of the invention, FIG. 15B a side view of an inner fin according to the second embodiment of the invention, and FIG. 15C a front view of an inner fin according to the second embodiment of the invention.
Figure 15B:
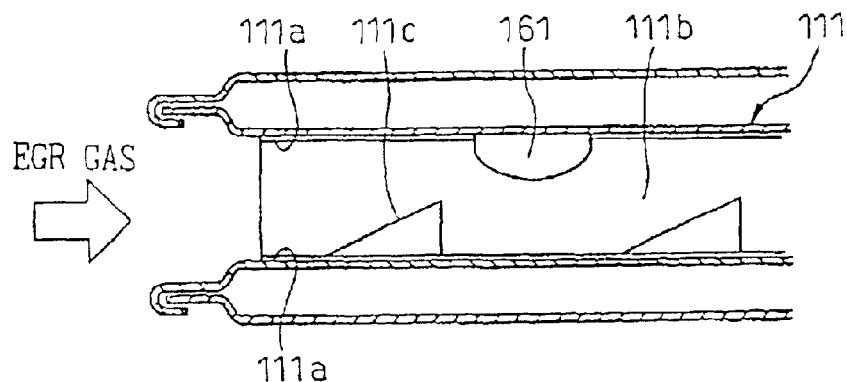
Figure 15C:
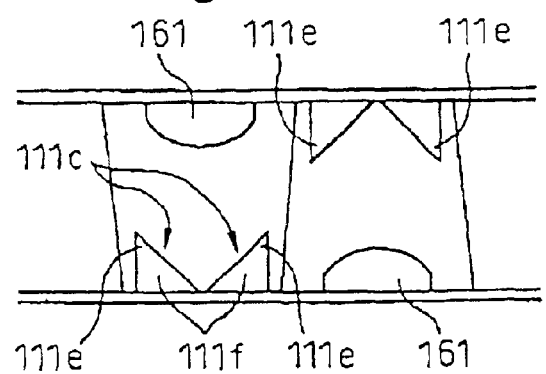

According to this embodiment, as shown in FIGS. 15A to 15C, a plurality of stainless steel plates 160 with a plurality of domed protrusions (dimples) 161 projecting inward of the exhaust gas passage 110 along the EGR gas flow are arranged between the inner fins 111 and the cuter wall of the cooling water passage 120 in addition to the inner fins 111.

This embodiment, which is not confined to the configuration having the protrusions 161 formed on the plate 160 as described above, may, alternatively, be so configured that the protrusions 161 may be formed on the laminate plates 131, 132 making up the cooling water passage 120.

The domed protrusions 161 in this embodiment, to which the present invention is not limited, may alternatively be formed in triangular or other shapes.

Third Embodiment

Figure 16:
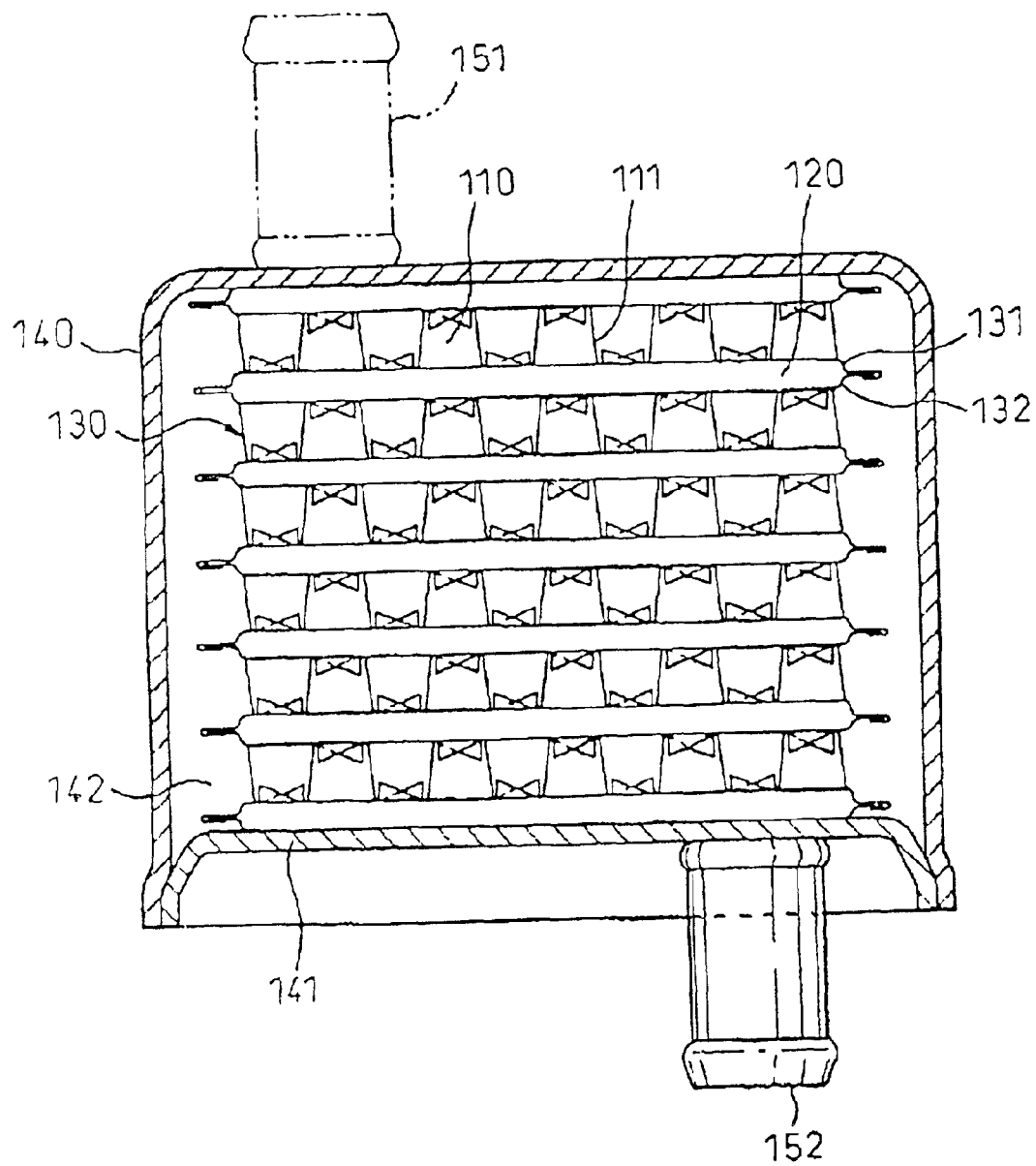
FIG. 16 is a sectional view of a gas cooler according to a third embodiment of the invention.
Figure 17A:
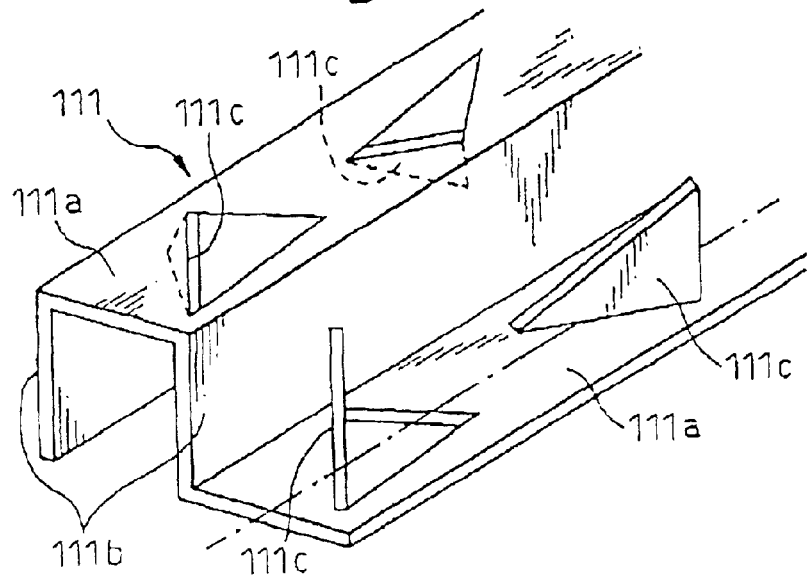
FIG. 17A is a perspective view of an inner fin according to the third embodiment of the invention, FIG. 17B a top plan view of the inner fin shown in FIG. 17A, and FIG. 17C a front view of the inner fin according to the first embodiment of the invention.

According to this embodiment, as shown in FIGS. 16 and 17, the louvres 111c are arranged in staggered fashion at an angle to, and along, the EGR gas flow.

Figure 17B:
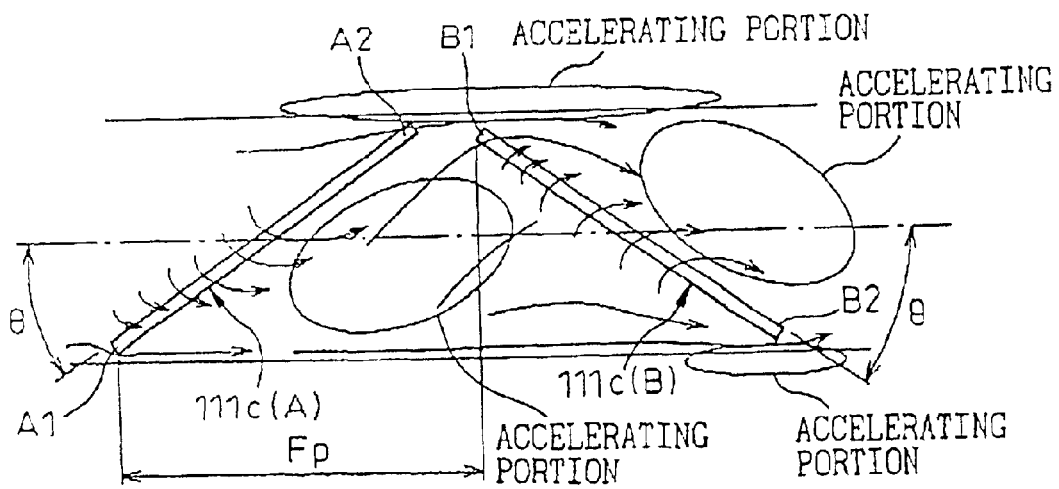
Figure 17C:
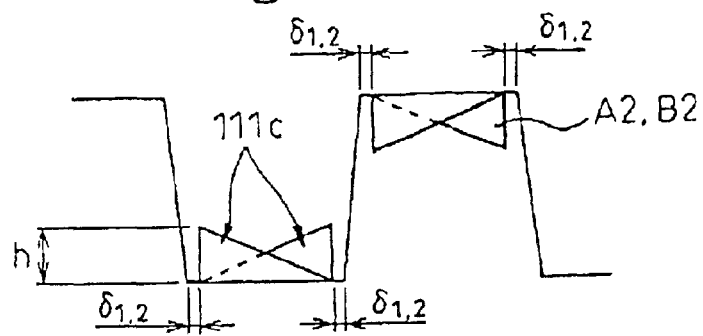

Of a plurality of the louvres 111c, each upstream louvre 111c located upstream in the EGR gas flow and the downstream louvre 111c located downstream in the EGR gas flow, which are arranged adjacently to each other in the EGR gas flow, as shown in FIG. 17B, are such that the forward end portion B1 of the downstream louvre 111c (B' of FIG. 17B) in the EGR gas stream is located downstream of the rear end portion A2 of the upstream louvre 111c (A' of FIG. 17B) in the EGR gas flow. At the same time, as shown in FIG. 17C, the upstream louvre 111c and the downstream louvre 111c are arranged substantially in superposition one on the other, as viewed along the direction of the exhaust gas flow, so that the forward end portion A1 of the upstream louvre 111c and the rear end portion B2 of the downstream louvre 111c are substantially superposed one on the other, and the rear end portion A2 of the upstream louvre 111c and the forward end portion B1 of the downstream louvre 111c are substantially superposed one on the other.

The tilt angle θ of the louvres 111c to the EGR gas flow (FIG. 17B) is preferably not less than 15° and not more than 45° (30° in this embodiment).

Now, the functions and effects of this embodiment will be explained.

According to this embodiment, the louvres 111c are formed to have a wall surface the distance of which from the flat plate portions 111a increases progressively downstream in the EGR gas flow. The EGR gas flowing in the exhaust gas passage 110, therefore, as shown in FIG. 18, after impinging on the louvres 111c, rides over the louvres 111c and flows downstream.

In the process, the exhaust gas pressure exerted on that upstream surface (A) of the louvre 111c impinged on by the EGR gas which faces the upstream side in the EGR gas flow is increased to a level higher level than the exhaust gas exerted on the downstream surface (B) on the other side of the louvre 111c in the EGR gas flow. As a result, part of the EGR gas flow that has impinged on the surface (A) rides over the louvre 111c and flows to the downstream surface (B) lower in exhaust gas pressure in the EGR gas flow. Thus, a continuous vertical swirl is generated so that the EGR gas stream flowing without impinging on the louvres 111c (surface (A)) is drawn toward the surface (B).

As shown in FIG. 17B, therefore, the EGR gas flowing in the vicinity of each flat plate portion 111a is accelerated by the continuous vertical swirl in such a manner as to be drawn between the louvres 111c. Thus, the flow rate of the EGR gas flowing in the vicinity of the flat plate portion 111a increases beyond the flow rate at which the ERG gas would flow with simple corrugated straight fins having no louvres 111c.

In similar fashion, the EGR gas flowing in the vicinity of each vertical plate portion 111b is also accelerated by the vertical swirl. Therefore, the flow rate of the EGR gas flowing in the vicinity of the vertical plate portion 111b becomes higher than that with simple corrugated straight fins having no louvres 111c.

Consequently, the heat conductivity of the EGR gas and the fins 111 can be improved while, at the same time, making it possible to blow off the particulate matters attached on the surface of the fins 111. Thus, while the fins 111 are prevented from being clogged, the heat exchange efficiency of the gas cooler can be improved.

Assume that the two louvres 111c of each louvre set are arranged slanted inwardly toward each other in such a manner that the distance between the louvres 111c increases progressively downstream in the EGR gas flow. In that case, the EGR gas streams are substantially symmetric about the middle surface between the louvres 111c. of the velocity component of the EGR gas impinging on the surface (A) of one of the two louvres 111c and flowing over the louvres 111c (hereinafter referred to as "the vertical swirl inducing flow"), the velocity component in the direction (transverse direction) perpendicular to the length of the flat plate portion 111a is liable to be reduced in flow rate as it is offset by the transverse velocity component of the vertical swirl inducing flow generated on the other one of the two louvres 111c.

In contrast, according to this embodiment with the louvres 111c arranged in staggered fashion along the EGR gas flow, the transverse velocity component of the vertical swirl induced flow is not offset but expands transversely. Therefore, the vertical swirl induced by the vertical swirl inducing flow, i.e. the portion of the EGR gas flow accelerated in the vicinity of the flat plate portions 111a is increased as compared with the case in which the two louvres 111c are arranged inwardly slanted. For this reason, the heat exchange efficiency of the gas cooler can be improved while preventing the clogging of the fins 111 positively.

Also, according to this embodiment, the louvres 111c are arranged in staggered fashion with respect to the EGR gas flow. As shown in FIG. 17, therefore, the main exhaust gas stream takes a zigzag course and changes the direction of flow by impinging. In this way, the particulate matter attached to the surface of the fins 111 can be more positively blown off. Thus, the heat exchange efficiency of the gas cooler can be improved while at the same time preventing the fins 111 from being clogged.

The forward end portion B1 of the downstream louvre 111c in the direction of the EGR gas flow is located downstream of the rear end portion A2 of the upstream louvre 111c in the direction of the EGR gas flow. Therefore, the vertical swirl inducing flow generated by the upstream louvre 111c can be prevented from disappearing by impinging on the downstream louvre 111c. Thus, the vertical swirl can be generated in a stable fashion.

In this embodiment, as described above, the distribution of the flow rate in the exhaust gas passage 110 is changed positively by generating the continuous vertical swirl for drawing to the surface (B) the EGR gas flowing without impinging on the louvres 111c (surface (A)) as described above thereby to accelerate the exhaust gas flow in the vicinity of the vertical plate portion (side wall portion) 111b. An excessively increased distance between the louvres 111c and the vertical plate portion 111b, however, is liable to make it impossible to sufficiently accelerate the exhaust gas flow in the vicinity of the vertical plate portion 111b.

In view of this, according to this embodiment, the distance 82 between the rear end portions A2, B2 of the louvres 111c and the vertical plate portion (side wall portion) 111b arranged at an angle to the adjacent flat plate portion 111a having the particular louvres 111c is set to a value larger than the maximum height h (FIG. 17C) of the louvres 111c by a factor not less than 0.15 but not more than twice or preferably unity, and further the distance 81 between the forward end portions A1, B1 of the louvres 111c and the vertical plate portion (side wall portion) 111b arranged at an angle to the adjacent flat plate portion 111a having the particular louvres 111c is set to a value larger than the maximum height h of the louvres 111c by a factor not less than 0.15 but not more than twice or preferably unity, thereby sufficiently accelerating the EGR gas flowing in the vicinity of the vertical plate portion 111b.

Also, the pitch Fp (FIG. 17B) between the upstream louvre 111c and the downstream louvre 111c is set to not less than 10 mm but not more than 30 mm.

FIG. 19 is a graph showing the relation between the temperature efficiency of the inner fins 111 according to this embodiment, the offset inner fins and the inner fins 111 according to this embodiment without the louvres 111c making up the straight fins on the one hand and the time during which the EGR gas is allowed to flow in the gas cooler 100. As is apparent from this graph, the inner fins 111 according to this embodiment are seen to have a higher initial temperature efficiency and a lower degree of decrease in the heat exchange efficiency than the other inner fins.

The offset fins are defined as those fins including tabular segments arranged in staggered fashion.

According to this embodiment, as in the first embodiment, the louvres 111c are each formed substantially as a triangle to have a surface 111f with the distance thereof from the inner wall of the exhaust gas passage increasing progressively downstream in the EGR gas flow, and the surface 111f of each of the louvres 111c is arranged at an angle to the direction of the EGR gas flow. Therefore, the EGR gas flow rate at the root of the louvres 111c is increased and the particulate matter attached at the root can be blown off.

Fourth Embodiment

Figure 20A:
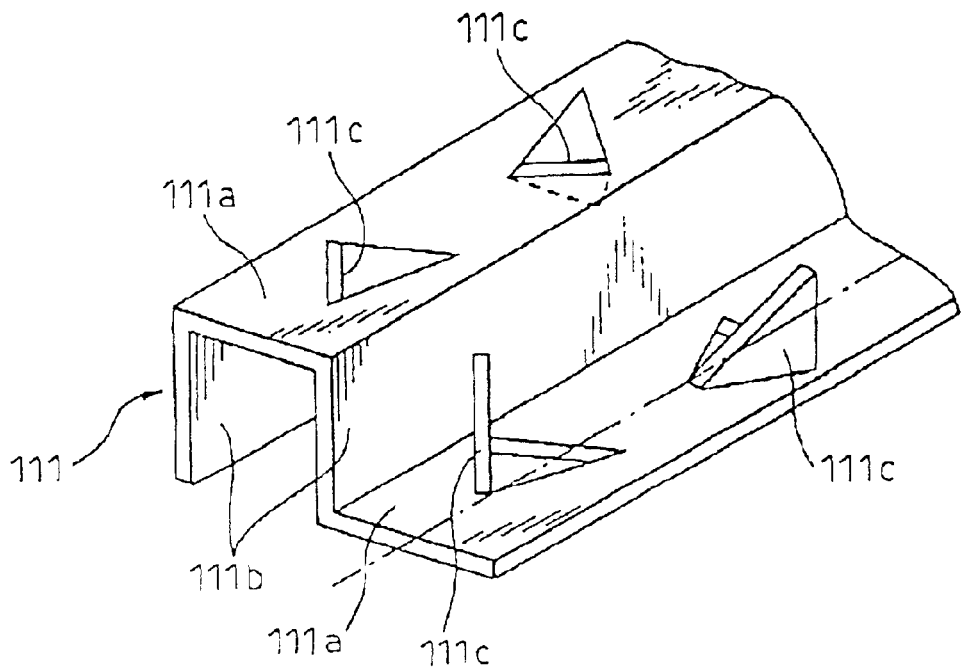
FIG. 20A is a perspective view of an inner fin according to a fourth embodiment of the invention, and FIG. 20B a top plan view of the inner fin shown in FIG. 20A.
Figure 20B:
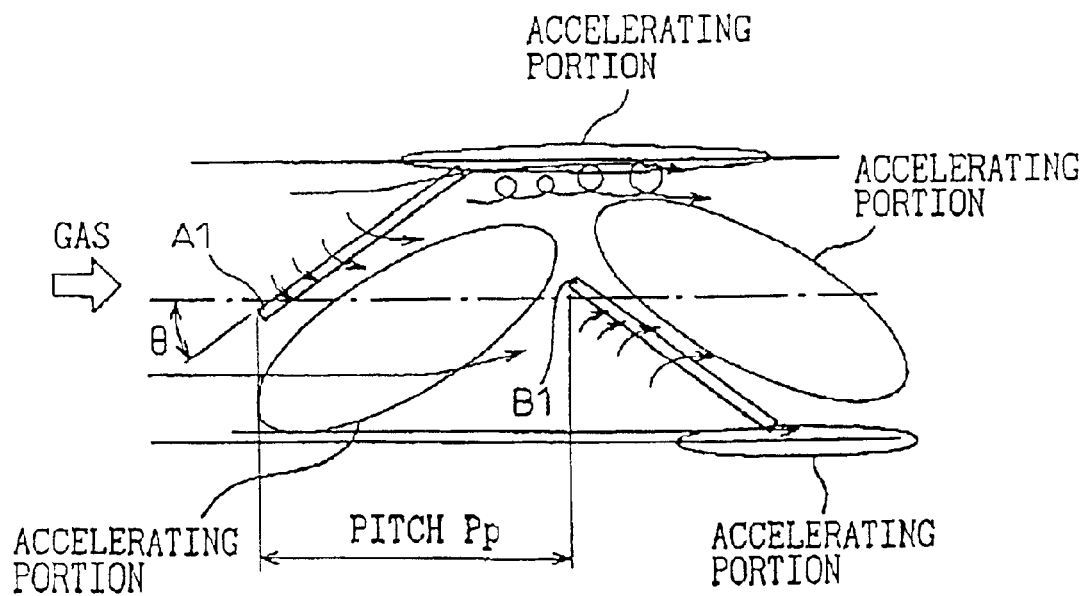

In the third embodiment, the portion of the louvre 111c substantially over the entire width of the flat plate portion 111a, i.e. over the entire portion extending perpendicular to the longitudinal direction of the flat plate portion 111a is cut. According to this embodiment, on the other hand, as shown in FIG. 20B, the portion of the louvres 111c occupying substantially one half of the width of the flat plate portion 111a is cut in such a manner that the forward end portion A1 of the upstream louvre 111c and the forward end portion 31 of the downstream louvre 111c are substantially in a superposed relation with each other as viewed from the direction of the exhaust gas flow.

FIG. 21 is a schematic diagram showing the EGR gas flow according to this embodiment, from which it is seen that, also according to this embodiment, the EGR gas flowing in the vicinity of the flat plate portion 111a is drawn between the louvres 111c by being accelerated by a continuous vertical swirl.

Fifth Embodiment

Figure 22A:
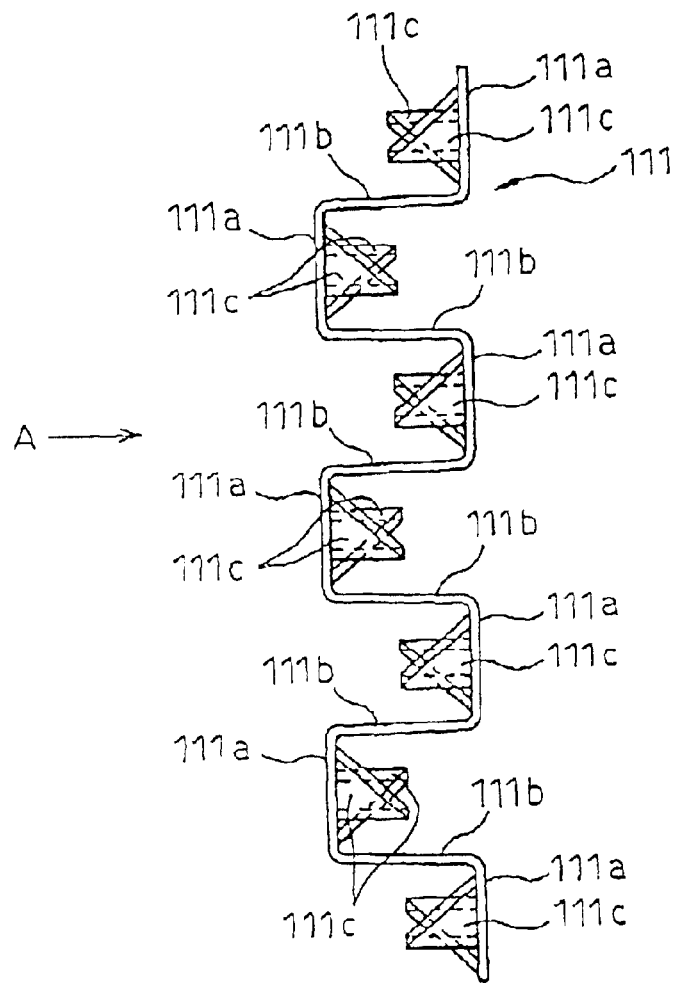
FIG. 22A is a front view of an inner fin according to a fifth embodiment of the invention, and FIG. 22B a view taken along the arrow A in FIG. 22A.
Figure 22B:
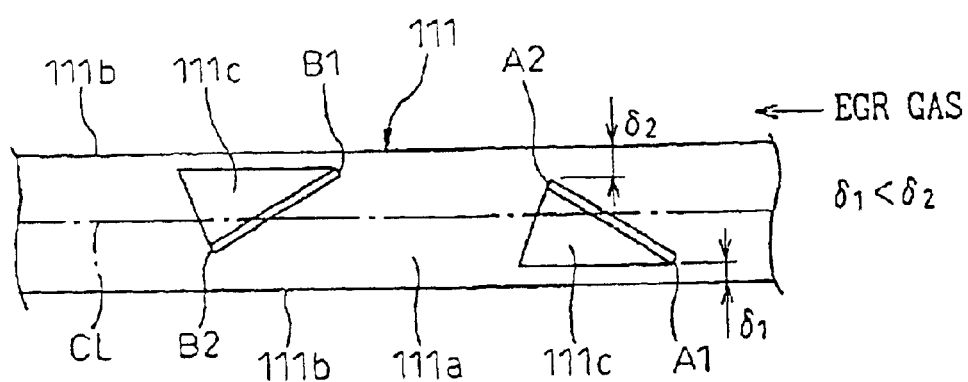

According to the third and fourth embodiments, the end portions A1, A2 of the upstream louvre 111c are superposed on the end portions B1, B2 of the downstream louvre 111c as viewed along the direction of the EGR gas flow. In the fifth embodiment, on the other hand, as shown in FIG. 22B, the upstream louvre 111c and the downstream louvre 111c are so arranged that the forward end portion A1 of the upstream louvre 111c and the rear end portion B2 of the downstream louvre 111c are displaced from each other, and so are the rear end portion A2 of the upstream louvre 111c and the forward end portion B1 of the downstream louvre 111c, as viewed from the direction of the EGR gas flow.

According to this embodiment, the upstream louvre 111c and the downstream louvre 111 are congruent. Therefore, the center of the upstream louvre 111c and the center of the downstream louvre 111 are displaced from each other with respect to the center line CL of the flat plate portion 111a.

Now, the features of this embodiment will be described.

The distance between the rear end portions A2, B2 of the louvres 111c and the flat plate portion 111a is larger than the distance between the forward end portions A1, B1 of the louvres 111c and the flat plate portion 111a. Therefore, the sectional area formed between the vertical plate portion 111b and the louvres 111c, through which the EGR gas can flow, is smaller for the rear end portions A2, B2 than for the forward end portions A1, B1. As a result, in the case where the distance δ2 (FIG. 17C), between the rear end portions A2, B2 and the vertical plate portion (side wall portion) 111b, is small, the particulate matter is liable to be deposited between the rear end portions A2, B2 and the vertical plate portion (side wall portion) 111b.

In this embodiment, however, the upstream louvre 111c and the downstream louvre 111c are so arranged that, as viewed in the direction of the EGR gas flow, the forward end portion A1 of the upstream louvre 111c and the rear end portion B2 of the downstream louvre 111c are displaced from each other, or the rear end portion A2 of the upstream louvre 111c and the forward end portion B1 of the downstream louvre 111c are displaced from each other. Without decreasing the size of the louvres 111c, therefore, the distance δ2 between the rear end portions A2, B2 and the vertical plate portion 111b can be increased. It is thus possible to prevent the particulate matters from being deposited between the rear end portions A2, B2 and the vertical plate portion 111b.

An increased distance δ2 between the rear end portions A2, B2 and the vertical plate portion 111b generates the EGR gas flowing downstream without impinging on the louvres 111c. The EGR gas flowing from the gaps between the rear end portions A2, B2 and the vertical plate portion 111b, however, impinges on the next louvres 111c and generates the vertical swirl. The particulate matter attached on the surface of the fins 111 can thus be blown off.

As described above, according to this embodiment, the clogging of the fins 111 can be prevented while at the same time improving the heat exchange efficiency of the gas cooler.

Sixth Embodiment

Figure 23A:
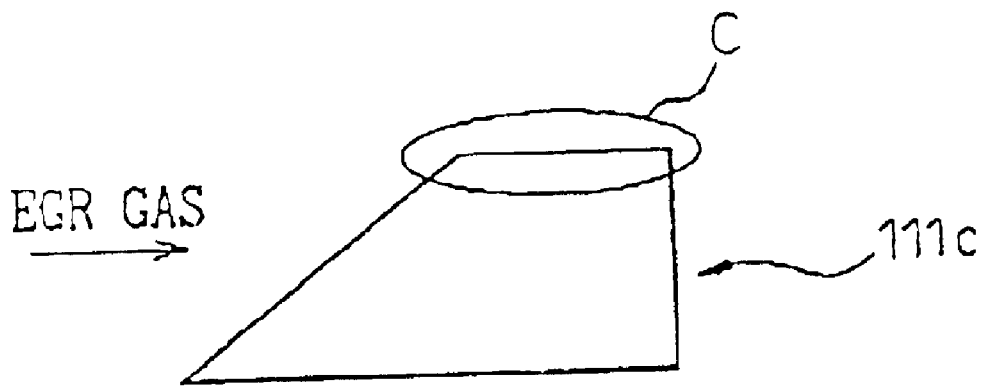
FIGS. 23A and 23B are front views of the louvres according to a sixth embodiment of the invention.
Figure 23B:
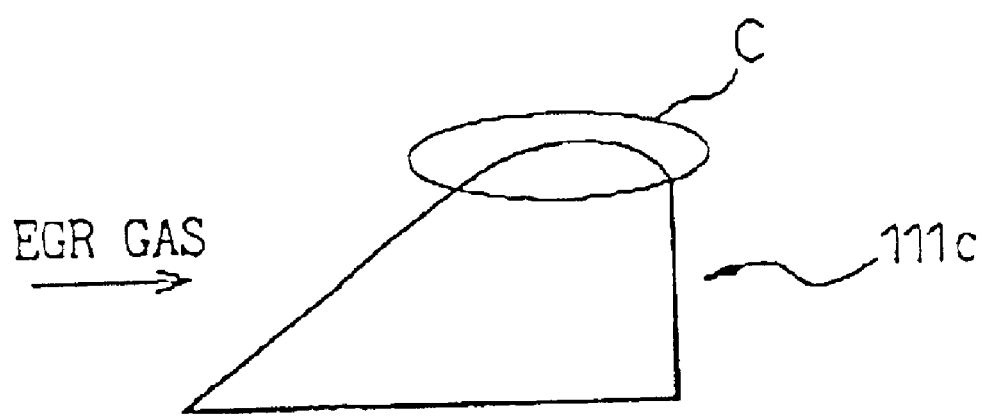

Unlike in the embodiments described above with the louvres 111c formed in a triangle, the present embodiment is such that, as shown in FIGS. 23A, 23B, the corner of the apex portion C where the distance is longest from the flat plate portion 111a to the rear end portions A2, B2 of the louvres 111c is set to not less than 90°.

FIG. 23B shows an example in which the corner of the apex portion C is set to not less than about 90° by smoothly curving the contour of the apex portion C, and FIG. 23A an example in which the corner of the apex portion C is set to not less than 90° by substantially making a trapezoid of the louvres 111c.

Now, the features of this embodiment will be explained.

The louvres 111c are exposed directly to the EGR gas and, therefore, in the case where the end portion shaped with a steep angle is corroded, the apex portion C may also be corroded and come off.

According to this embodiment, in contrast, the corner of the apex portion C is formed with an obtuse angle of not less than about 90°. Therefore, the surface area of the apex portion C is increased, and the apex portion C, even if corroded, is prevented from coming off by corrosion.

In this embodiment, as described above, the apex portion C is merely prevented from forming with a steep angle and it should not be limited to form to less than 90° strictly.

Seventh Embodiment

In the first and second embodiments, the end of the hole 111d of the flat plate portion 111a far from the cut end of each louvre 111c is closed by being brought into contact with the inner wall of the exhaust gas passage 110 (the outer wall of the cooling water passage 120). This invention is not limited to this configuration, but the hole 111d may be closed by other means.

Also, unlike in the embodiments described above in which the louvres 111c are arranged only on the flat plate portion 111a, the louvres 111c may be formed also on the vertical plate portion (side wall portion) 111b in addition to the flat plate portion 111a.

Further, the louvres 111c according to this invention, which are triangular in the aforementioned embodiments, are not confined to a triangle in shape in the strict sense of the word, but may assume any other shape in which the distance from the flat plate portion 111a increases progressively downstream in the EGR gas flow.

Also, according to the first and second embodiments, the forward end portions of the louvres 111c making up the louvres set, i.e. the upstream end portions of the louvres in the EGR gas flow are formed closer to each other. The present invention, however, is not limited to such a configuration, but a predetermined space may be formed between the forward ends of the louvres 111c.

The embodiments described above represent an application of an exhaust gas heat exchanger according to the present invention to the gas cooler 100. Nevertheless, the present invention is equally applicable to the heat exchanger arranged in the muffler for recovering the thermal energy from the exhaust gas or other heat exchangers.

Figure 24B:
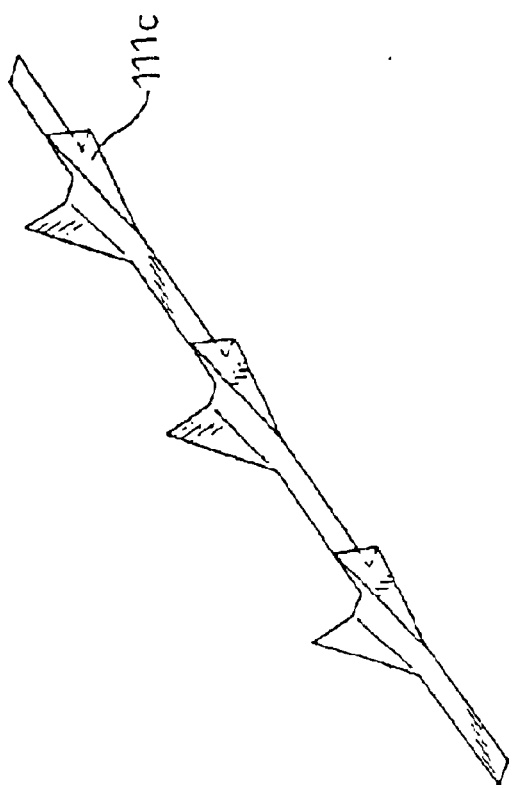
FIGS. 24A and 24B are perspective views of the louvres according to a seventh embodiment of the invention.

The present invention is not limited to the configuration in which the louvres 111c are formed by cutting a part of the fins 111 as described in the embodiments above. Instead, as shown in FIGS. 24A, 24B, the louvres 111c may be formed in a tabular member independent of the fins 111, and the particular tabular member may be coupled to the fins 111 by such means as brazing so that no hole is formed between the louvres 111c of each louvre set.

Figure 24A:
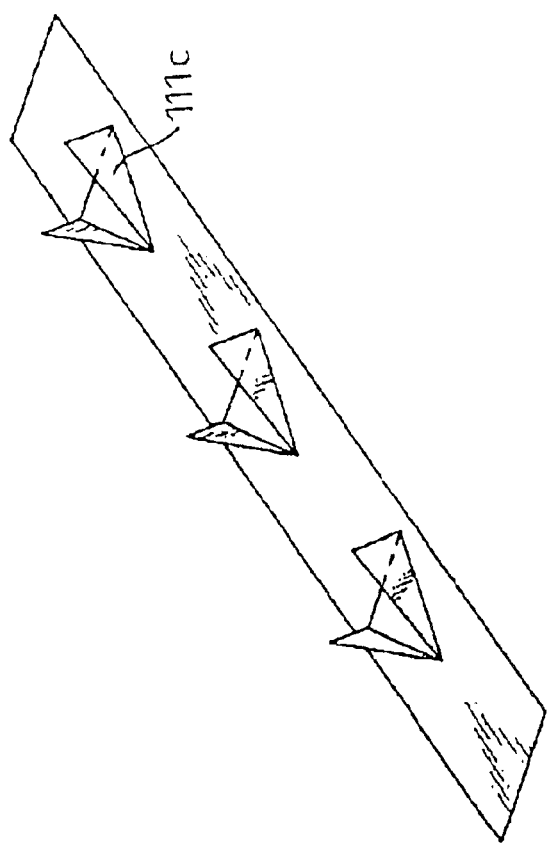

FIG. 24A shows an example in which the louvres 111c are formed by cutting parts of a tabular member in two opposite directions. FIG. 24B, on the other hand, shows an example in which the louvres 111c are formed by cutting outside parts of the tabular member.

Figure 25:
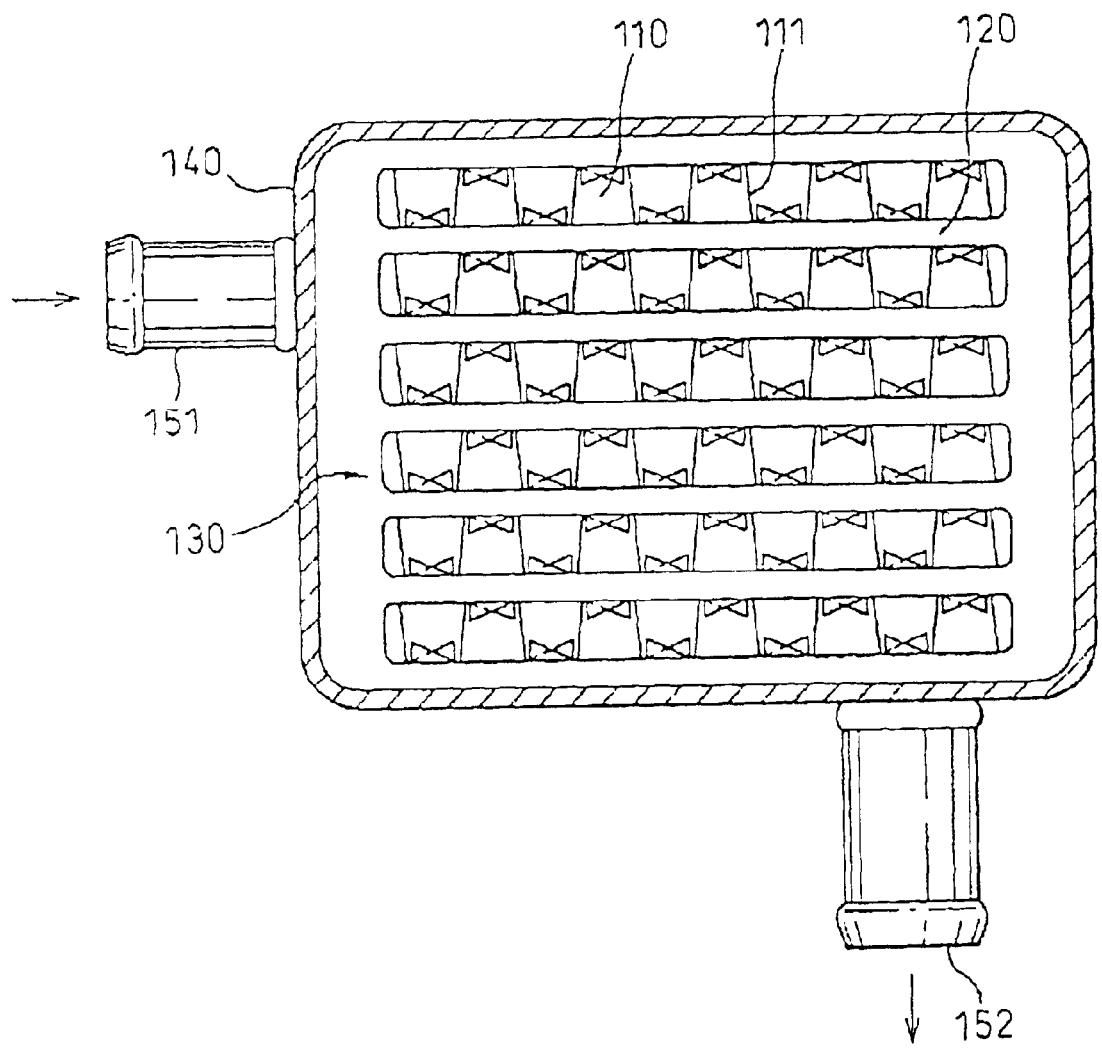
FIG. 25 is a sectional view of a gas cooler according to the seventh embodiment of the invention.

Also, the present invention is not limited to the configuration of the embodiments described above in which the cooling water passage 120 is formed by arranging a plurality of sets of two laminate plates 131, 132 in layers. Instead, the cooling water passage 120 may be configured of a tube fabricated by coupling plate members by roll welding, or by coupling plate members stamped in channel shape as shown in FIG. 25.

Eighth Embodiment

As is obvious from the foregoing explanation of the operation of the louvres 111c, the louvres 111c (first protrusions) according to this embodiment have such a characteristic that, in the case where the direction of flow of the EGR gas is changed with respect to the louvres 111c, the condition of the EGR gas flow on the downstream side of the louvres 111c is also changed considerably. If the inner fins 111 are assembled on the tube (exhaust gas passage) 110 in a wrong direction, therefore, the functions and effects described above cannot be achieved.

Figure 26A:
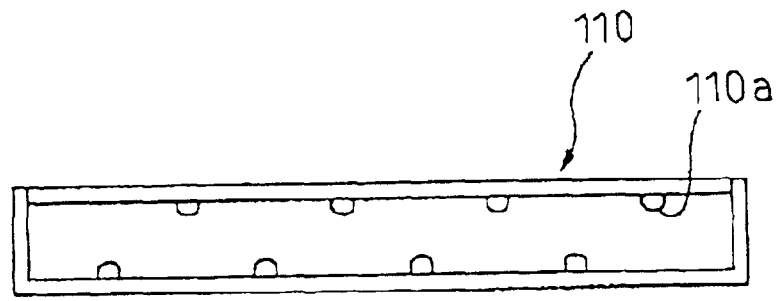
FIG. 26A is a front view of an exhaust gas passage according to an eighth embodiment of the invention, and FIG. 26B a perspective view of an exhaust gas passage according to the eighth embodiment.
Figure 26B:
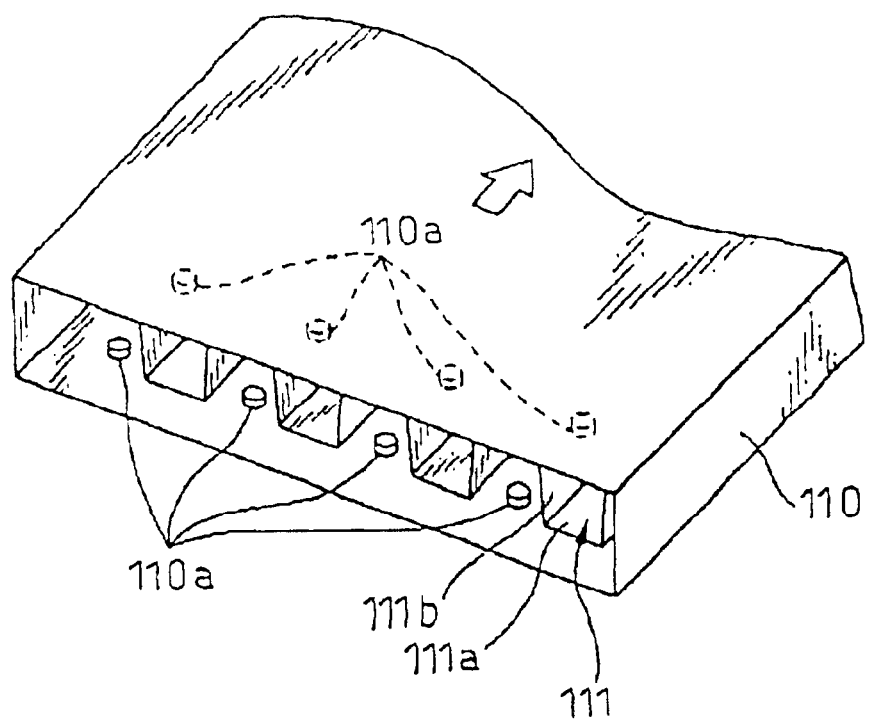

According to this embodiment, each of the parts of the inner wall at the longitudinal end of the tube 110 which faces the inside surface of each flat plate portion 111a, as shown in FIGS. 26A, 26B, is formed with a protrusion (second protrusion) 110a projected inward of the tube 110. In this embodiment, a plurality of the protrusions 110a are formed on the tube 110 by stamping or forging such as punching (coining). The "inside surface of the flat plate portion (bent portion) 111a" is defined as a portion corresponding to the central portion side of the bend (the central portion side of the radius is of curvature).

Specifically, as shown in FIG. 26A, a plurality of the protrusions 110a are arranged in staggered fashion so as to be 180° out of phase with the inner fins 111 along he short diameter of the tube 110 (i.e. in FIG. 26A, so as to be located at the flat plate portion 111a assuming that the inner fins 111 are inverted vertically).

A plurality of the protrusions 110a formed according to this embodiment may, of course, be replaced with a single protrusion 110a with equal effect.

In this embodiment, those parts of the inside surface of the tube 110 facing the flat plate portions 111a are formed with a plurality of protrusions 110a projected inward of the tube 110. Assuming that the inner fins 111 are assembled on the tube 110 in the wrong direction, therefore, the protrusions 110a and the outside surface of the flat plate portions 111a of the inner fin 111 (the surfaces of the flat plate portions on the other side of the center of the bend, i.e. the surfaces on the other side of the center of the radius of curvature) would interfere with each other.

As a result, the inner fins 111 cannot be assembled on the tube 110 in the wrong direction (orientation), thereby making it possible to prevent an error in the assembly of the inner fins 111.

Instead of forming the protrusions 110a on the parts of the tube 110 in opposed relation to the inside surface of the corresponding flat plate portions 111a as in this embodiment, the protrusions 110a may alternatively be formed on the corresponding outside surface parts of the flat plate portions 111a (the surfaces of the flat plate portions on the other side of the center of the bend, i.e. on the other side of the center of the radius of curvature), respectively, if appropriate recesses to receive the protrusions 110a are formed on the flat plate portions 111a.

As shown in FIGS. 26A, 26B, a mark indicating the direction (an arrow in this embodiment) may be described on the tube 110. The mark may be attached by any specific means including the mechanical method such as stamping or felt pen.

Ninth Embodiment

According to this embodiment, a protective measure is taken to prevent the assembly error of the tube (exhaust gas passage) 110 and the core plate 121.

Specifically, the inner fins 111, even when assembled in normal direction on the tube 110, would be directed oppositely with respect to the EGR gas flow if the tube 110 with the inner fins 111 thereon is assembled in a wrong direction, resulting in an assembly error of the inner fins 111.

In view of this, according to this embodiment, as shown in FIGS. 27 and 28, the tube insertion holes (fitting portions) 121a at one of the longitudinal ends of the tube 110 are shaped different from the tube insertion holes (fitting portions) 121a at the other longitudinal end of the tube 110.

As a result, the first longitudinal end of the tube 110 is prevented from being erroneously assembled on the core plate 121 at the second longitudinal end of the tube 110, or the second longitudinal end of the tube 110 is prevented from being erroneously assembled on the core plate 121 at the first longitudinal end of the tube 110.

FIG. 27 represents a case in which the short diameter substantially at the center of the long diameter of the tube insertion holes 121a is smaller than the short diameter in other parts. FIG. 28, on the other hand, represents a case in which the short diameter substantially at the center of the long diameter of the tube insertion holes 121a is larger than the short diameter in other parts.

According to this embodiment, each tube insertion hole 121a is not limited to the shape shown in FIGS. 27, 28. As an alternative, for example, the section at one longitudinal end of the tube 110 may be elliptical while the section at the other longitudinal end thereof may be rectangular.

Other Embodiments

This invention is not limited to the configuration of the aforementioned embodiments in which the protrusions 110a are formed at the longitudinal ends of the tube 110. Instead, the protrusions 110a may be formed at the longitudinal central part or other parts of the tube 110. As another alternative, a plurality of the protrusions 110a may be formed along the length of the tube 110.

Figure 29:
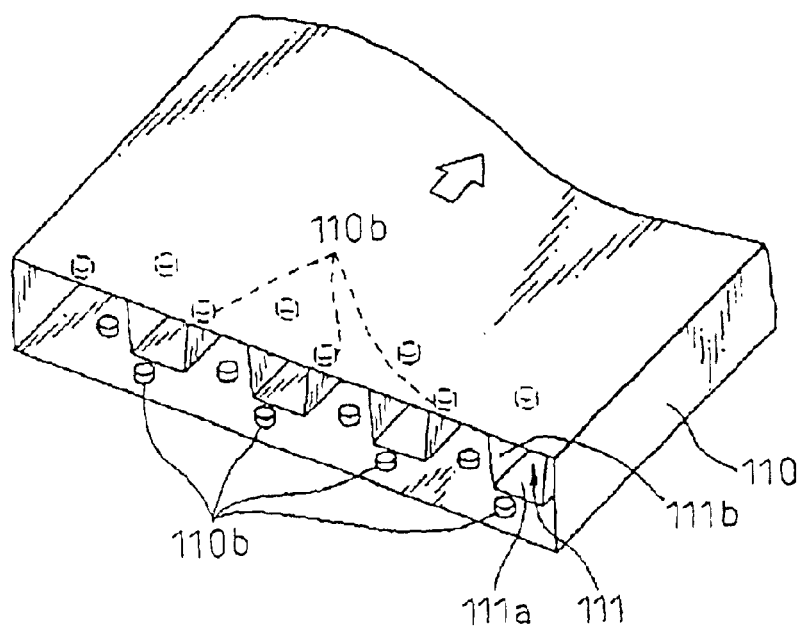
FIG. 29 is a perspective view of an inner fin according to another embodiment of the invention.
Figure 30:
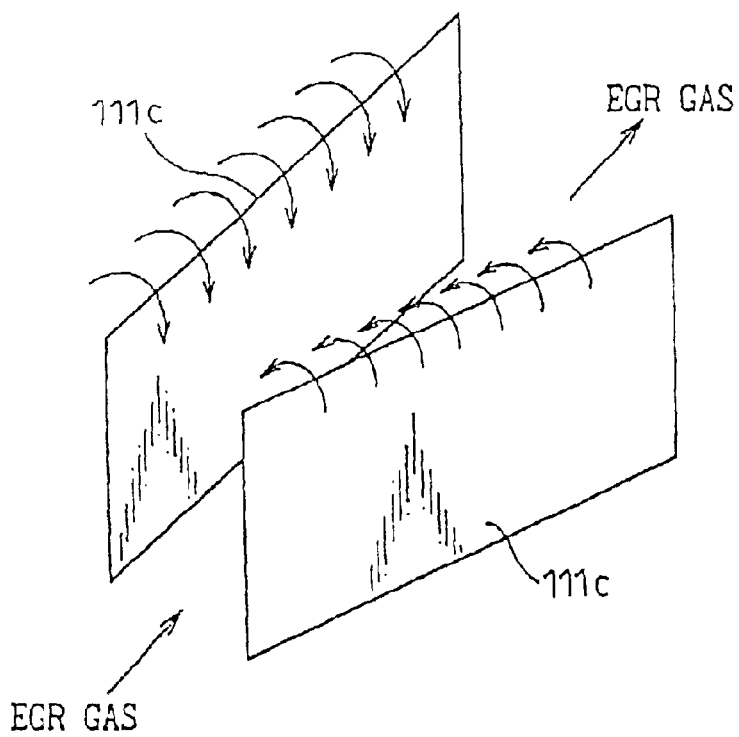
FIG. 30 is a diagram for explaining the problem points of the inner fins according to the prior art.
Figure 31A:
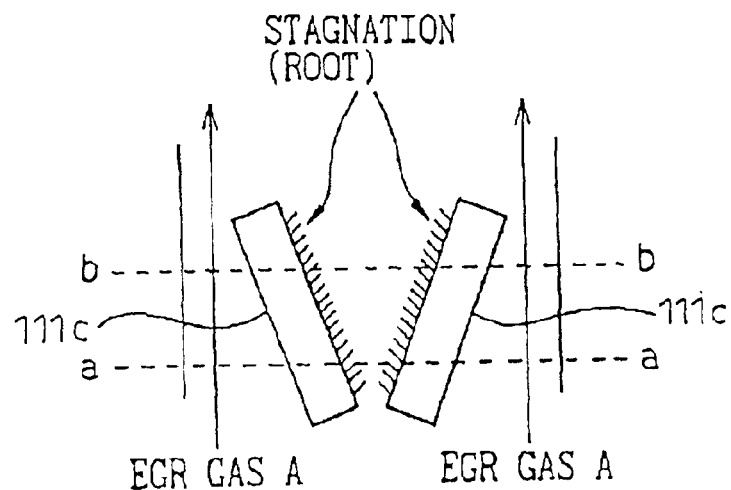
FIGS. 31A to 31C are diagrams for explaining the problem points of the inner fins according to the prior art.
Figure 31B:
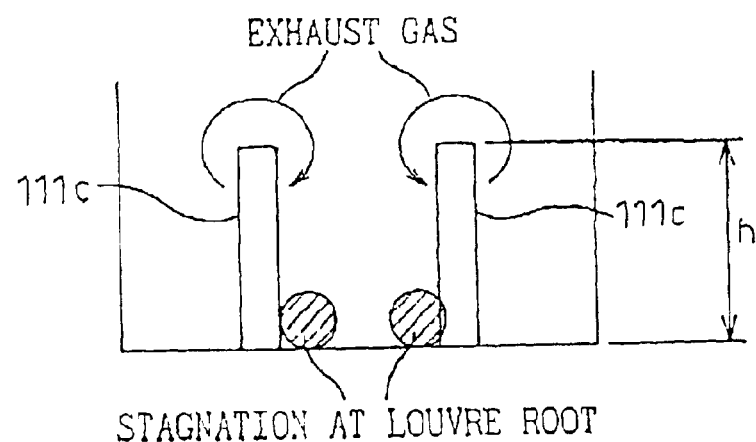
Figure 31C:
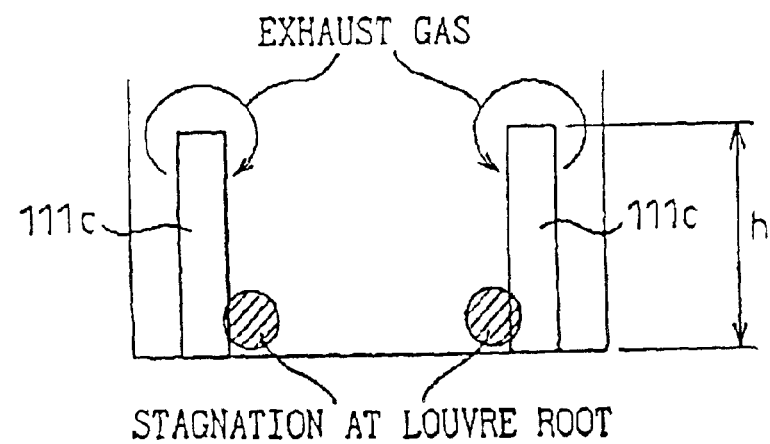

Further, as shown in FIG. 29, stopper protrusions 110b for setting the fins 111 in position may be formed on the tube 110 in addition to the protrusions 110a.

The present invention is not limited to the tube 110 having a rectangular section as in the embodiments described above. As an alternative, the tube 110 may have a elliptical section with arcuate ends of the long diameter thereof.

Although the tube 110 in the embodiments described above is an electro-resistance-welded tube, the invention is not limited to such a tube, but the cooler core 130 (the tubes 110 and the cooling water passages 150) may be configured of plates stamped into a predetermined shape and in superposed relation with each other.

Also, in spite of the fact that the component parts of the gas cooler 100 including the tube 110, the core plate 121, the tank body 122 and the core casing 140 are brazed according to the embodiments described above, the present invention is not limited to such a configuration but may employ other coupling methods including welding.

Furthermore, the louvres 112c may be formed with protrusions in shapes other than a substantial triangle, as in the aforementioned embodiments, to increase the distance from the flat plate portion 111a progressively downstream in the EGR gas flow.

While the invention has been described by reference to specific embodiments chosen for purposes of illustration, it should be apparent that numerous modification could be made thereto by those skilled in the art without departing from the basic concept and scope of the invention.

What is claimed is:

1. A heat exchanger for exchanging heat between an exhaust gas of an internal combustion engine and a cooling fluid, the heat exchanger comprising:

a plurality of flat exhaust gas passages through which said exhaust gas flows; and a plurality of corrugated fins arranged in each of said exhaust gas passages to promote heat exchanging between said exhaust gas and said cooling fluid, each of said fins including a plurality of flat plate portions and a plurality of side wall portions as viewed from a direction of the exhaust gas flow; wherein a plurality of louvres are disposed on inner walls of said exhaust gas passages along the direction of the exhaust gas flow, a surface of each of said louvres having a height measured from said inner wall which increases in the direction of said exhaust gas flow.

2. A heat exchanger according to claim 1, wherein the plurality of louvres are configured of a plurality of pairs of said louvres, and a gap between each said louvres gradually increases towards downstream of said exhaust gas.

3. A heat exchanger according to claim 2, wherein upstream end portions of each of said pairs of louvres in said exhaust gas flow are arranged in a spaced relation with each other.

4. A heat exchanger according to claim 2, wherein a distance ($\bar{o}$) between a downstream end of each of said louvres in said exhaust gas flow and said side wall portion is not less than 0.5 times as large as the maximum height (h) of said louvre but more than twice as large as the maximum height (h) of said louvre.

5. A heat exchanger according to claim 4, wherein the distance ($\bar{o}$) between the downstream end of each of said louvres in said exhaust gas passage and said side wall portion is not less than 0.5 times as large as the maximum height (h) of said louvre but not more than the maximum height (h) of said louvre.

6. A heat exchanger according to claim 2, wherein said plurality of flat plate portions are substantially parallel to the direction of said exhaust gas flow and said plurality of side wall portions are formed at an angle to said flat plate portions as viewed from the direction of the exhaust gas flow, and wherein said louvres are each formed by cutting parts of each of said flat plate portions.

7. A heat exchanger according to claim 6, wherein holes formed by cutting parts of each of said flat plate portions are closed by defining members defining said exhaust gas passages.

8. A heat exchanger according to claim 1, wherein the plurality of louvres are arranged in a staggered fashion at an angle to said direction of said exhaust gas flow along said exhaust gas flow.

9. A heat exchanger according to claim 8, wherein an angle of a corner of an apex portion at a rear end portion of at least one of the louvres, for which the distance from said flat plate portion is longest, is not less than 90°.

10. A heat exchanger according to claim 8, wherein a contour of an apex portion at a rear end portion of at least one of the louvres, for which the distance from said flat plate portion is longest, is a smooth curve.

11. A heat exchanger according to claim 8, wherein said louvres are formed substantially as a trapezoid in such a manner as to have a surface of which the distance from the flat plate portion increases progressively downstream in the direction of exhaust gas flow.

12. A heat exchanger according to claim 8, wherein a distance ($\delta 2$) between a rear end portion of each of said louvres and said side wall portion is not less than 0.15 times as large as the maximum height (h) of said louvre but not more than twice as large as the maximum height (h) of said louvre.

13. A heat exchanger according to claim 12, wherein the distance ($\delta 2$) between the rear end portion of each of said louvres in said exhaust gas passages and said side wall portion is not less than 0.15 times as large as the maximum height (h) of said louvre but not more than the maximum height (h) of said louvre.

14. A heat exchanger according to claim 8, wherein a distance ($\delta 2$) between a rear end portion of each of said louvres and said side wall portion adjacently arranged at an angle to said flat plate portion having said louvre is larger than a distance ($\delta 1$) between a forward end portion of said louvre and said side wall portion adjacently arranged at the angle to said flat plate portion having said louvre.

15. A heat exchanger according to claim 8, wherein, of the plurality of louvres, an upstream louvre located upstream in said exhaust gas flow and a downstream louvre located downstream in said exhaust gas flow adjacently to said upstream louvre are arranged in such a manner that a forward end portion of said downstream louvre in said direction of said exhaust gas flow is located downstream of a rear end portion of said upstream louvre in said direction of said exhaust gas flow.

16. A heat exchanger according to claim 15, wherein said upstream louvre and said downstream louvre are arranged in superposed relation with each other as viewed from the direction of said exhaust gas flow.

17. The heat exchanger according to claim 15, wherein said upstream louvre and said downstream louvre are arranged in such a manner that the forward end portion of said upstream louvre and the rear end portion of said downstream louvre are displaced from each other as viewed from the direction of said exhaust gas flow.

18. A heat exchanger according to claim 15, wherein said upstream louvre and said downstream louvre are arranged in such a manner that the rear end portion of said upstream louvre and the forward end portion of said downstream louvre are displaced from each other as viewed from the direction of said exhaust gas flow.

19. A heat exchanger according to claim 15, wherein said upstream louvre and said downstream louvre are arranged in such a manner that a forward end portion of said upstream louvre and a rear end portion of said downstream louvre are substantially in superposed relation with each other as viewed from the direction of said exhaust gas flow.

20. A heat exchanger according to claim 15, wherein said upstream louvre and said downstream louvre are arranged in such a manner that the rear end portion of said upstream louvre and the forward end portion of said downstream louvre are substantially in a superposed relation with each other as viewed from the direction of said exhaust gas flow.

21. A heat exchanger according to claim 15, wherein a tilt angle ($\theta$) of each of said louvres with respect to said direction of exhaust gas flow is not less than 15° but not more than 45°.

22. A heat exchanger according to claim 15, wherein a distance ($\delta 1$) between the forward end portion of said downstream louvre and said side wall portion is not less than 0.15 times as large as the maximum height (h) of said louvre but not more than twice as large as the maximum height (h) of said louvre.

23. A heat exchanger according to claim 22, wherein the distance ($\delta 1$) between a forward end portion of each of said louvres in said exhaust gas passages and a respective side wall portion is not less than 0.15 times as large as the maximum height (h) of said louvre but not more than the maximum height (h) of said louvre.

24. A heat exchanger according to claim 1, wherein each wall of said exhaust gas passage which corresponds to a respective flat plate portion of said corrugated fin is formed with a second protrusion projected inward of said exhaust gas passage.

25. A heat exchanger according to claim 24,
wherein said second protrusions are each formed at a part facing the inside of said flat plate portion.

26. A heat exchanger according to claim 24,
wherein said exhaust gas passage has a flat section, and the plurality of said second protrusions are arranged in a staggered fashion along a width of said tube.

27. A heat exchanger according to claim 24,
wherein said second protrusions are formed on a longitudinal end portion of said exhaust gas passage.

28. A heat exchanger according to claim 24, wherein
the plurality of said exhaust gas passages are arranged in parallel to each other, and a header tank communicating with the plurality of said exhaust gas passages is coupled by being fitted in a fitting portion at each of the longitudinal end portions of each of the plurality of said exhaust gas passages and a shape of said fitting portion at one longitudinal end portion of said tube and a shape of said fitting portion at the other longitudinal end portion of said tube are different from each other.

29. A heat exchanger according to claim 24,
wherein a plurality of third protrusions projected inward of said exhaust gas passage for setting said fins in position with respect to said exhaust gas passage are formed on said tube.

30. A heat exchanger according to claim 1, wherein
said plurality of exhaust gas passages includes a plurality of tubes arranged parallel to each other, and a header tank communicating with the plurality of tubes is coupled by being fitted in a fitting portion at each of longitudinal end portions of each of the plurality of tubes, and a shape of said fitting portion at one longitudinal end portion of said tube and a shape of said fitting portion at the other longitudinal end portion of each of said tubes are different from each other.

31. A heat exchanger according to claim 1,
wherein an upstream end portion of each of said louvres is formed continuously from a bottom surface of said corrugated fin.

32. A heat exchanger according to claim 1,
wherein an upstream end portion of each of said louvres has a height (H) such that gas flow riding over said louvre reaches a root of said louvre.

33. A heat exchanger for exchanging heat between exhaust gas emitted from an internal combustion engine and a cooling fluid, the heat exchanger comprising:

a flat exhaust gas passage through which said exhaust gas flows;

a plurality of corrugated fins arranged in said exhaust gas passage; and a plurality of louvres formed on an inner wall of said exhaust gas passage, each of the plurality of louvres being inclined at a predetermined angle to a direction of said exhaust gas flow, wherein each of said louvres include a first part having a height so as to form a swirl reaching a bottom surface of said louvre, and a second part which is higher than said first part and located downstream of said first part in said direction of said exhaust gas flow; and the plurality of said louvres are arranged in a staggered manner such that each of said louvres is arranged along the direction of said exhaust gas flow at alternately different predetermined angles with respect to the direction of said exhaust gas flow.

34. A heat exchanger for exchanging heat between an exhaust gas of an internal combustion engine and a cooling fluid, comprising:

a plurality of flat exhaust gas passages through which said exhaust gas flows therein; and a plurality of corrugated fins arranged in each of said exhaust gas passages to promote heat exchanging between said exhaust gas and said cooling fluid, each of said fins including a plurality of flat plate portions and a plurality of side wall portions as viewed from a direction of the exhaust gas flow; wherein a plurality of louvres are disposed on inner walls of said exhaust gas passages along the direction of the exhaust gas flow, a surface of each of said louvres having a height measured from said inner wall which increases in the direction of said exhaust gas flow, and the plurality of louvres are arranged in a staggered manner such that each of said louvres is arranged along the direction of said exhaust gas flow at alternately different predetermined angles with respect to the direction of said exhaust gas flow.

* * * * *